US010608938B2

(12) United States Patent
Lee et al.

(10) Patent No.: US 10,608,938 B2
(45) Date of Patent: *Mar. 31, 2020

(54) METHOD AND APPARATUS FOR CONTROLLING TRAFFIC QUALITY

(71) Applicant: Samsung Electronics Co., Ltd, Suwon-si (KR)

(72) Inventors: Chulki Lee, Seoul (KR); Jungshin Park, Seoul (KR); Franklin Antony, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 19 days.

This patent is subject to a terminal disclaimer.

(21) Appl. No.: 15/496,975

(22) Filed: Apr. 25, 2017

(65) Prior Publication Data

US 2017/0230291 A1  Aug. 10, 2017

Related U.S. Application Data

(63) Continuation of application No. 15/022,920, filed as application No. PCT/KR2014/008663 on Sep. 17, 2014.

(30) Foreign Application Priority Data

Sep. 17, 2013  (KR) ........................ 10-2013-0112119

(51) Int. Cl.
*G06F 11/00* (2006.01)
*H04L 12/801* (2013.01)
(Continued)

(52) U.S. Cl.
CPC .............. *H04L 47/11* (2013.01); *H04L 29/08* (2013.01); *H04L 47/10* (2013.01); *H04L 47/20* (2013.01);
(Continued)

(58) Field of Classification Search
CPC ....... H04L 47/11; H04L 67/322; H04L 65/80; H04L 47/20; H04L 29/08; H04L 47/10; H04W 4/60; H04W 28/02; H04W 8/18
(Continued)

(56) References Cited

U.S. PATENT DOCUMENTS

2003/0179705 A1* 9/2003 Kojima ............... H04L 43/0876
370/230
2011/0312283 A1 12/2011 Rodbro et al.
(Continued)

FOREIGN PATENT DOCUMENTS

KR  10-2004-0026072      3/2004
KR  10-2010-0084911 A    7/2010
(Continued)

OTHER PUBLICATIONS

International Search Report dated Dec. 18, 2014 in connection with International Patent Application No. PCT/KR2014/008663, 5 pages.
(Continued)

*Primary Examiner* — Chuong T Ho

(57) ABSTRACT

A method for controlling traffic transmission in a control server of a communication system includes receiving information of an application corresponding to a network session; receiving, from a network node, information related to a network congestion condition with respect to the network session; and controlling a traffic flow of the network session on the basis of a traffic quality policy which is determined on the basis of the received application information and/or the information related to the network congestion condition. The control server can receive, from an electronic device, the application information of an application corresponding to the network session. The control server can determine the quality policy on the basis of the application information.
(Continued)

The control sever can control the traffic flow of the network session according to the quality policy.

18 Claims, 26 Drawing Sheets

(51) Int. Cl.
| | |
|---|---|
| H04L 29/08 | (2006.01) |
| H04L 29/06 | (2006.01) |
| H04W 4/60 | (2018.01) |
| H04L 12/813 | (2013.01) |
| H04W 8/18 | (2009.01) |
| H04W 28/02 | (2009.01) |

(52) U.S. Cl.
CPC ............ *H04L 65/80* (2013.01); *H04L 67/322* (2013.01); *H04W 4/60* (2018.02); *H04W 8/18* (2013.01); *H04W 28/02* (2013.01)

(58) Field of Classification Search
USPC .................................................. 370/230–235
See application file for complete search history.

(56) References Cited

U.S. PATENT DOCUMENTS

| | | | | |
|---|---|---|---|---|
| 2012/0051216 A1* | 3/2012 | Zhang | ..................... | H04L 47/12 370/230 |
| 2012/0120843 A1* | 5/2012 | Anderson | ......... | H04W 52/0232 370/253 |
| 2013/0051228 A1 | 2/2013 | Kim et al. | | |
| 2013/0070599 A1* | 3/2013 | Xu | ..................... | H04L 41/5022 370/235 |
| 2013/0114456 A1 | 5/2013 | Dahod | | |
| 2013/0132559 A1 | 5/2013 | Kotecha et al. | | |
| 2013/0272121 A1* | 10/2013 | Stanwood | ........... | H04L 47/2475 370/230 |
| 2014/0177535 A1* | 6/2014 | Tjandra | ................. | H04W 72/10 370/329 |
| 2015/0009826 A1* | 1/2015 | Ma | .................... | H04W 28/0289 370/235 |
| 2016/0014635 A1* | 1/2016 | Rasanen | ................. | H04L 47/14 370/230 |
| 2016/0100271 A1* | 4/2016 | Buyukkoc | ............... | H04W 4/00 370/235 |
| 2016/0173394 A1* | 6/2016 | Harvell | ................... | H04L 47/25 709/203 |

FOREIGN PATENT DOCUMENTS

| | | |
|---|---|---|
| KR | 10-2013-0001439 | 1/2013 |
| WO | WO 2011//136589 A2 | 11/2011 |
| WO | WO 2013/051793 A1 | 4/2013 |
| WO | WO 2013/133676 A1 | 9/2013 |

OTHER PUBLICATIONS

Written Opinion of the International Searching Authority dated Dec. 18, 2014 in connection with International Patent Application No. PCT/KR2014/008663, 6 pages.
European Search Report dated Mar. 20, 2017 in connection with International Patent Application No. PCT/KR2014/008663, 13 pages.
Foreign Communication from Related Counterpart Application; European Patent Application No. 14845052.1; Communication pursuant to Article 94(3) EPC dated Feb. 19, 2018; 11 pages.
Korean Intellectual Property Office Office Action regarding Application No. 10-2013-0112119, dated Nov. 15, 2019, 12 pages.

* cited by examiner

FIG. 10

```
$ lsof -i
PID   USER  FD    TYPE  DEVICE    SIZE/OFF  NODE  NAME
2314  jake  75u   IPv4  3616770   0t0       TCP   jk.local:48912 -> 168.219.61.252:http-alt (ESTABLISHED)
2996  jake  30u   IPv6  1527813   0t0       TCP   localhost:49392 -> localhost:5037 (ESTABLISHED)
2996  jake  73u   IPv6  1527863   0t0       TCP   localhost:49394 -> localhost:5037 (ESTABLISHED)
2996  jake  113u  IPv6  2980249   0t0       TCP   localhost:44847 -> localhost:5037 (ESTABLISHED)
2996  jake  124u  IPv6  1218695   0t0       TCP   localhost:8700 (LISTEN)
2996  jake  131u  IPv6  1585196   0t0       TCP   localhost:35540 -> localhost:5037 (ESTABLISHED)
2996  jake  132u  IPv6  1585198   0t0       TCP   localhost:8600 (LISTEN)
2996  jake  133u  IPv6  1585196   0t0       TCP   localhost:36948 -> localhost:5037 (ESTABLISHED)
2996  jake  134u  IPv6  1588062   0t0       TCP   localhost:8601 (LISTEN)
2996  jake  135u  IPv6  2980251   0t0       TCP   localhost:8602 (LISTEN)
2996  jake  145u  IPv6  1271457   0t0       TCP   localhost:49211 -> localhost:5554 (ESTABLISHED)
2996  jake  147u  IPv6  1527888   0t0       TCP   localhost:49403 -> localhost:5037 (ESTABLISHED)
2996  jake  148u  IPv6  1527890   0t0       TCP   localhost:8604 (LISTEN)
2996  jake  149u  IPv6  1527891   0t0       TCP   localhost:49404 -> localhost:5037 (ESTABLISHED)
2996  jake  150u  IPv6  1527893   0t0       TCP   localhost:8605 (LISTEN)
2996  jake  153u  IPv6  1527897   0t0       TCP   localhost:49406 -> localhost:5037 (ESTABLISHED)
```

| PID  | PR | CPU% | S | #THR | VSS      | RSS    | PCY | UID    | Name |
|------|----|------|---|------|----------|--------|-----|--------|------|
| 289  | 0  | 1%   | S | 70   | 234464K  | 46700K | fg  | system | system_server |
| 1053 | 0  | 1%   | R | 1    | 1116K    | 472K   |     | root   | top |
| 37   | 0  | 1%   | S | 8    | 39828K   | 24840K | fg  | system | /system/bin/surfaceflinger |
| 392  | 0  | 0%   | S | 15   | 168328K  | 37360K | fg  | u0_a23 | com.android.systemui |
| 433  | 0  | 0%   | S | 27   | 175720K  | 38360K | fg  | radio  | com.android.phone |
| 590  | 0  | 0%   | S | 13   | 157280K  | 18604K | bg  | u0_a1  | com.android.quicksearchbox |
| 491  | 0  | 0%   | S | 18   | 181792K  | 54132K | fg  | u0_a5  | com.android.launcher |
| 8    | 0  | 0%   | S | 1    | 0K       | 0K     |     | root   | cqueue |
| 9    | 0  | 0%   | S | 1    | 0K       | 0K     |     | root   | kseriod |
| 10   | 0  | 0%   | S | 1    | 0K       | 0K     |     | root   | kmmcd |
| 11   | 0  | 0%   | S | 1    | 0K       | 0K     |     | root   | pdflush |
| 12   | 0  | 0%   | S | 1    | 0K       | 0K     |     | root   | pdflush |
| 13   | 0  | 0%   | S | 1    | 0K       | 0K     |     | root   | kswapd0 |
| 14   | 0  | 0%   | S | 1    | 0K       | 0K     |     | root   | aio/0 |
| 25   | 0  | 0%   | S | 1    | 0K       | 0K     |     | root   | mtdblockd |
| 26   | 0  | 0%   | S | 1    | 0K       | 0K     |     | root   | kstriped |
| 27   | 0  | 0%   | S | 1    | 0K       | 0K     |     | root   | hid compat |
| 28   | 0  | 0%   | S | 1    | 0K       | 0K     |     | root   | rpciod/0 |
| 29   | 0  | 0%   | S | 1    | 0K       | 0K     |     | root   | mmcqd |
| 30   | 0  | 0%   | S | 1    | 292K     | 172K   |     | root   | /sbin/ueventd |
| 31   | 0  | 0%   | S | 1    | 836K     | 344K   |     | system | /system/bin/servicemanager |
| 32   | 0  | 0%   | S | 3    | 4088K    | 860K   |     | root   | /system/bin/vold |
| 34   | 0  | 0%   | S | 7    | 8632K    | 1240K  |     | root   | /system/bin/netd |

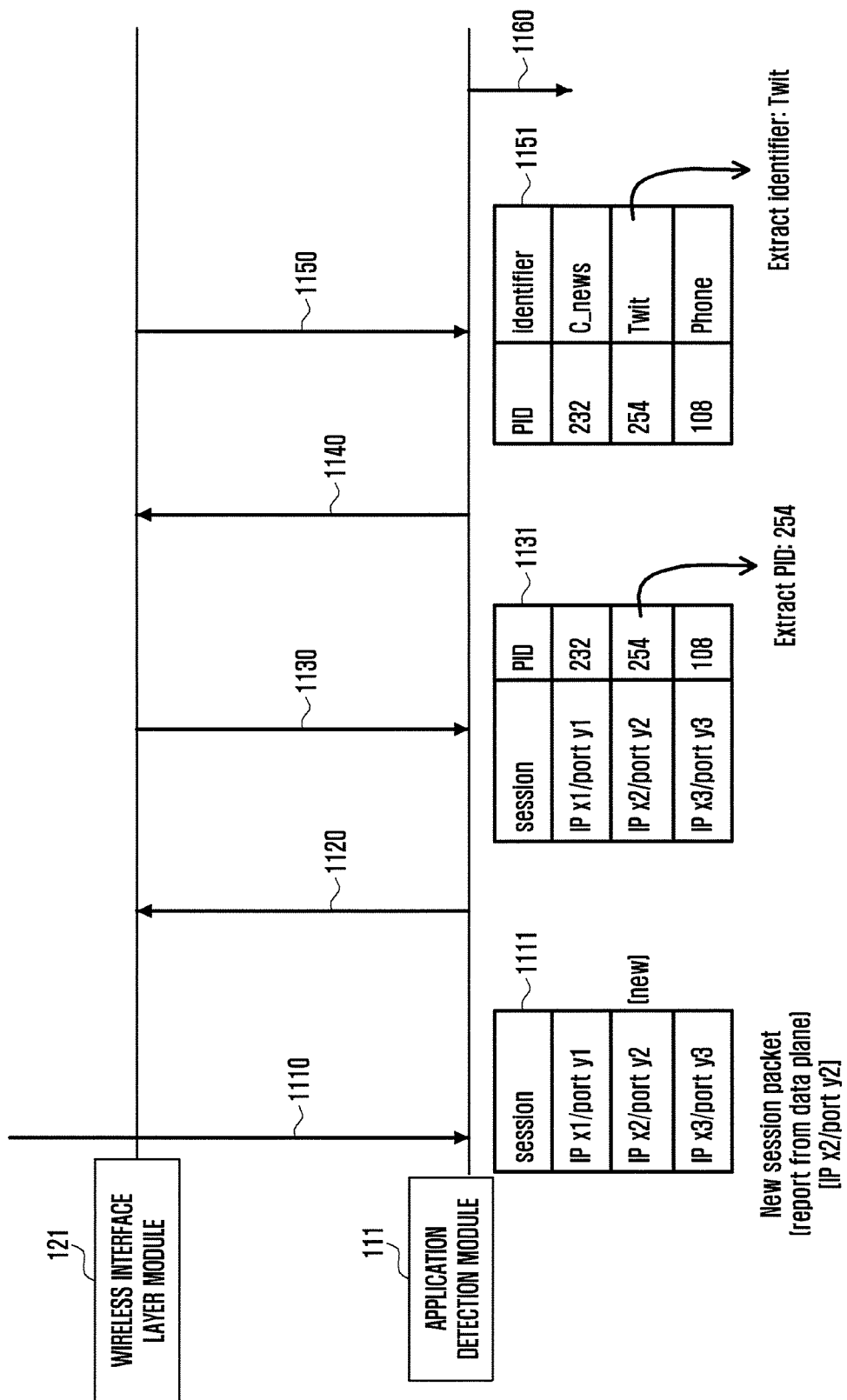

METHOD AND APPARATUS FOR CONTROLLING TRAFFIC QUALITY

CROSS-REFERENCE TO RELATED APPLICATION(S)

The present application is a continuation of U.S. patent application Ser. No. 15/022,920 filed on Mar. 17, 2016, which claims priority under 35 U.S.C. § 365 to International Patent Application No. PCT/KR2014/008663 filed Sep. 17, 2014, entitled "METHOD AND APPARATUS FOR CONTROLLING TRAFFIC QUALITY", and, through International Patent Application No. PCT/KR2014/008663, to Korean Patent Application No. 10-2013-0112119 filed Sep. 17, 2013, each of which are incorporated herein by reference into the present disclosure as if fully set forth herein.

TECHNICAL FIELD

The present invention relates to a method and an apparatus for controlling traffic quality, and more particularly to a method and an apparatus for controlling traffic quality of a network session for a communication service.

BACKGROUND ART

Various applications are provided in electronic devices. A user may download an application from an application market server to an electronic device, receive an application using a separate path, or produce and install an application in the electronic device. The user may receive a communication service between a service server and the electronic device through the application.

As not only a voice service for transmitting/receiving a voice signal but also various communication services including a multimedia data service, such as a text, a photo, and a moving image, are provided through applications installed in a computer or a portable terminal, network resources for supporting the communication services are required.

In order to efficiently use the limited network resources, there is a need for researches for schemes to predict traffic that occurs due to communication services for various applications and to control a flow of the traffic.

DISCLOSURE OF INVENTION

Technical Problem

The present invention has been made in order to solve the above problems, and an aspect of the present invention provides a method and an apparatus for controlling a traffic flow on the basis of application information in controlling traffic quality.

Another aspect of the present invention provides a method and an apparatus for controlling a traffic flow in which application information can be detected in an electronic device and the detected application information can be received in a control server in controlling traffic quality.

Still another aspect of the present invention provides a method and an apparatus for controlling a traffic flow that occurs due to an application on the basis of application information in controlling traffic quality.

Yet still another aspect of the present invention provides a method and an apparatus for controlling a traffic flow in which application information can be acquired in an electronic device using a communication module and an operating system.

Solution to Problem

In one aspect of the present invention, a method for controlling traffic transmission in a control server of a communication system includes: receiving information of an application corresponding to a network session; receiving, from a network node, information related to a network congestion condition with respect to the network session; and controlling a traffic flow of the network session on the basis of a traffic quality policy which is determined on the basis of at least one of the received application information and the information related to the network congestion condition.

In another aspect of the present invention, a method for transmitting and receiving traffic in an electronic device of a communication system includes: transmitting application information corresponding to a network session to a control server; and transmitting and receiving the traffic through a traffic flow of the network session which is controlled on the basis of a traffic quality policy determined on the basis of a traffic quality policy that is determined on the basis of a network congestion condition related to the network session and the application information.

In still another aspect of the present invention, a control server for controlling traffic transmission in a communication system includes: a transceiver unit configured to transmit and receive a signal with a network node including a terminal; and a control unit configured to control the transceiver unit, to receive information of an application corresponding to a network session, to receive, from the network node, information related to a network congestion condition with respect to the network session, and to control a traffic flow of the network session on the basis of a traffic quality policy which is determined on the basis of at least one of the received application information and the information related to the network congestion condition.

In yet still another aspect of the present invention, an electronic device for transmitting and receiving traffic in a communication system includes: a transceiver unit configured to transmit and receive a signal with a network node including a control server; and a control unit configured to control the transceiver unit, to transmit application information corresponding to a network session to the control server, and to transmit and receive the traffic through a traffic flow of the network session which is controlled on the basis of a traffic quality policy determined on the basis of a traffic quality policy that is determined on the basis of a network congestion condition related to the network session and the application information.

Advantageous Effects of Invention

Since the traffic flow that occurs due to the application is controlled on the basis of the application information, network communication resources can be efficiently used.

Further, since the control server determines the quality policy using the application information detected in the electronic device, the traffic flow can be controlled more accurately in comparison to the scheme to estimate the application in the network.

Further, if a new network session is generated in the electronic device, the application information is acquired through the communication module and the operating system, and thus the traffic flow can be controlled more economically in comparison to the scheme to use packet inspection in the network.

BRIEF DESCRIPTION OF DRAWINGS

FIG. 10 is an exemplary diagram explaining examples of a network session, a process identifier, and application information according to an embodiment of the present invention;

FIG. 11 is an exemplary diagram explaining a procedure of acquiring application information in an electronic device according to an embodiment of the present invention;

MODE FOR THE INVENTION

Figure 1:
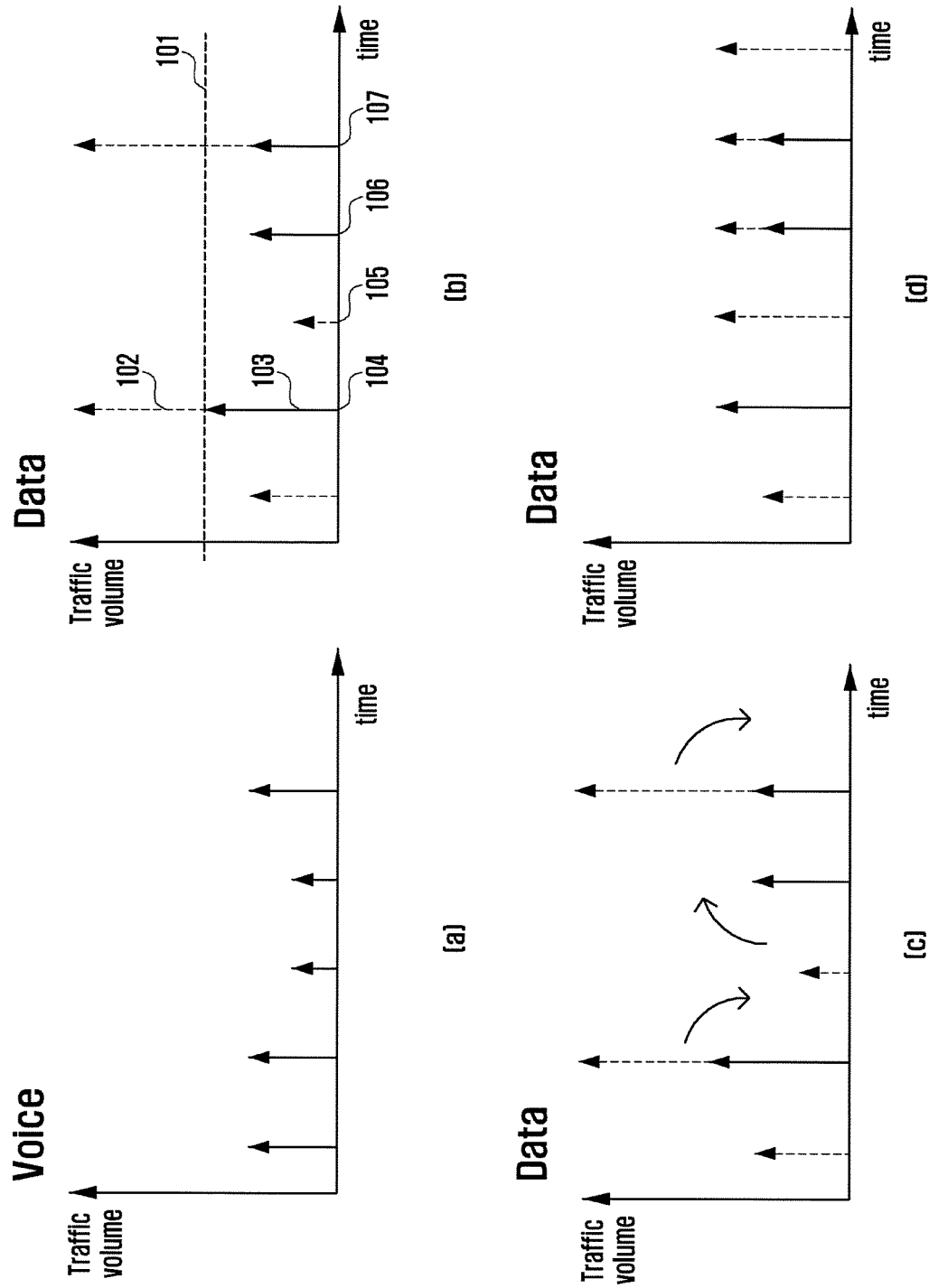
FIG. 1 is an exemplary diagram explaining the concept of control of a traffic flow according to an embodiment of the present invention.

Hereinafter, methods for manufacturing and using the present invention will be described in detail. The term "unit" or "module" described in the description of the present invention means a unit for processing at least one function or operation, and may be implemented by hardware, software, or a combination thereof.

An electronic device according to an embodiment of the present invention may be implemented in various types. For example, the electronic device described in the description of the present invention may be a portable terminal, a computer, a communication card, or a device having a communication function, such as a modem chip or dongle, or may include a device that is combined with another device to provide the communication function, but is not limited thereto. A portable terminal may be a portable phone, a smart phone, a laptop computer, a tablet PC, an e-book terminal, a terminal for digital broadcasts, a Personal Digital Assistants (PDA), a Portable Multimedia Player (PMP), a navigation device, a wrist-watch phone, or a wearable PC.

Hereinafter, an embodiment of the present invention will be described in detail so that it can be easily carried out by those of ordinary skill in the art to which the present invention pertains. However, the present invention may be implemented in various different types, and thus is not limited to the embodiment described hereinafter. In the drawings, portions that are not related to the description are omitted to clearly describe the present invention, and throughout the entire description, the same reference numerals are used for the same constituent elements.

FIG. 1 is an exemplary diagram explaining the concept of control of a traffic flow according to an embodiment of the present invention.

Referring to (a) of FIG. 1, the traffic volume of a voice service according to time may be featured to have uniform distribution according to time in comparison to the traffic volume of a data service within the traffic capacity of a network.

Referring to (b) of FIG. 1, the traffic volume of the data service according to time may be featured to vary non-periodically and arbitrarily in comparison to the traffic volume of the voice service. For example, the traffic volume of the data service may include traffic 102 for a first application and traffic 103 for a second application in a specific time period. The traffic volumes that occur due to the first application and the second application may be larger than traffic capacities 101 at time 104 and at time 107. In this case, the traffic that occurs at time 104 or after the time 104 may not be processed to cause a loss of a packet of the corresponding traffic or a delay of the communication service.

A control server according to an embodiment of the present invention is an entity that belongs to a network, and may perform a function corresponding to an application through control of the communication service quality or traffic flow. Further, the control server may perform a function that satisfies Quality of Service (QoS) or Quality of Experience (QoE) that is demanded by a user, a service provider, or a communication service provider. In order to prevent the deterioration of service quality due to the traffic occurrence as shown in (b) of FIG. 1 and to use network resources efficiently, the control server may predict the traffic volume and control the traffic flow.

If an application is driven in an electronic device, the network traffic that occurs due to the application may be featured to have the traffic volume according to time corresponding to the corresponding application or a specific pattern. For example, the traffic feature may include at least one of a maximum, minimum, or average data rate, a packet size, and a bandwidth.

Further, in order to smoothly provide a communication service through an application, network resources may be necessary so that the traffic feature of a predetermined level corresponding to the application appears, or the QoS corresponding to the application may be required. For example, in order to provide the communication service for the application, a Real Time Transport Protocol (RIP) method of the network session for the communication service may be required. Further, if the communication service is performed according to a protocol, such as an RTP, Transmission Control Protocol (TCP), or User Datagram Protocol (UDP), the traffic feature according to the protocol may appear. Further, in addition to protocol information, the minimum data rate, the maximum data rate, or packet size information may be used to predict the amount of network resource consumption. For example, the traffic feature of the RTP may include the occurrence of periodic traffic in the minimum data rate and the maximum data rate, and the traffic feature of the TCP may include the occurrence of burst traffic on the basis of the maximum data rate.

The protocol method for the network session may be in association with the category of an application. In an embodiment, the category of the application may be determined in accordance with the character of the application. The character of the application may be determined on the basis of at least one of a user's utilization method, a data transmission method, and the kind of data that is transmitted and received. As an example, an application that corresponds to a Social Network Service (SNS) or a game category may require the RTP method and may have a relatively high packet transmission priority. Further, an application that corresponds to a Point to Point (P2P) or File Transfer Protocol (FTP) category may have a relatively large amount of network resource consumption and a required packet transmission priority that is lower than that of an application that corresponds to the SNS category.

Application information may include a required QoS or category. Network session information may include protocol information. As described above, the traffic volume or traffic pattern according to time may be predicted on the basis of the application information corresponding to each application, traffic feature, or network session information.

For example, the traffic volume as shown in (b) of FIG. 1 may be predicted on the basis of first application information and second application information. Further, it may be assumed that the second application has higher resource allocation priority than the resource allocation priority of the first application in accordance with the QoS that belongs to the first application information and the QoS that belongs to the second application information. As illustrated in (c) of FIG. 1, the control server may operate to block or delay the traffic 102 of the first application at a specific time to maintain the traffic volume equal to or smaller than the traffic capacity 101 as illustrated in (d) of FIG. 1. In consideration of the first application traffic 102 that is expected due to the generation of the network session of the first application at time 104, the control server may operate to block the network session of the first application at time 104 and to form the blocked network session at time 105. Further, the control server may operate to delay the network session of the first application that is generated at time 104 or the traffic of the first application being predicted, and thus the traffic of the first application may occur after time 106. In the same manner, the control server may efficiently use the network resources to avoid the traffic congestion by controlling the traffic that is expected at time 105 to occur at time 106, controlling the traffic that is expected at time 106 to occur at time 107, and controlling the traffic that is expected at time 107 to occur after time 107. More specifically, according to an embodiment of the present invention, the control server may block or delay the traffic being transmitted so that the traffic volume can be formed within the traffic capability at each time.

Figure 2:
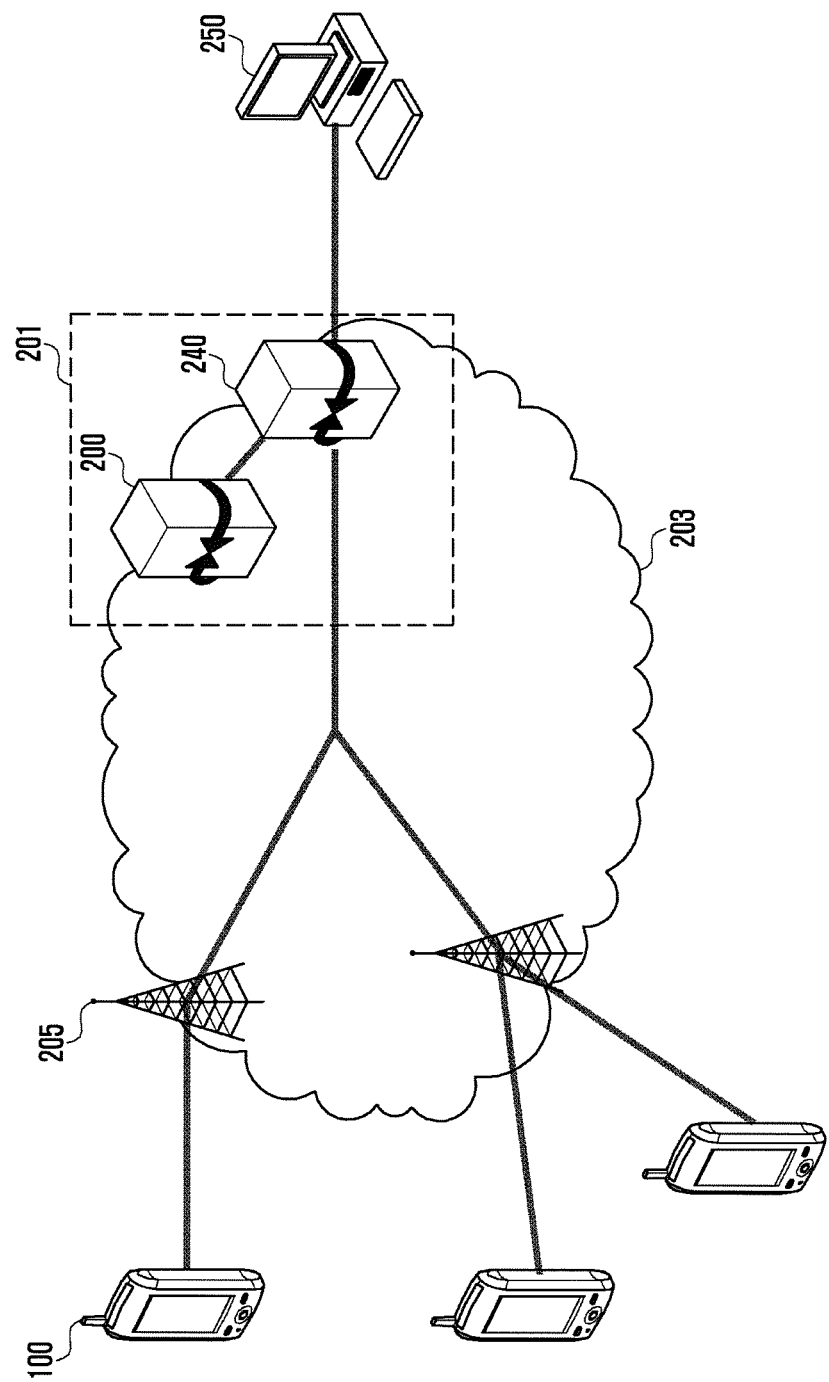
FIG. 2 is an exemplary diagram illustrating a communication system according to an embodiment of the present invention.

FIG. 2 is an exemplary diagram illustrating a communication system according to an embodiment of the present invention.

A communication system may include an electronic device 100 and a control server 200. The communication system may include a service server 250. Further, the communication system may include a network 203 to which the control server 200 belongs. The network 203 may include a base station 205, a gateway 240, and the control server 200. Further, the communication system may further include an application market server (not illustrated). In an embodiment, each node may be mentioned as a network node.

For example, in the case where a Long Term Evolution (LTE) communication method is supported in the communication system, the electronic device 100 may be User Equipment (UE), the base station 205 may be dNodeB (eNB), the gateway 240 may be a Package Data Network Gateway (P-GW), and the control server 200 may be a Policy and Charging Rule Function (PCRF). Further, the control server may be configured through combination of the PCFRF and the P-GW. Further, the network 203 may further include a Mobility Management Entity (MME) and a Serving Gateway (S-GW).

Further, the communication system may support not only a wireless mobile communication system but also a wired or wireless Internet communication system. For example, the electronic device 100 may be connected to a gateway (home gateway or enterprise gateway) by a wired or wireless system, such as WiFi or LAN, at home or in an office, and may be connected to the network 203 through the gateway. It should be noted that the communication system is not limited to any specific communication system, but can support various communication systems or can be configured as various combinations of various entities.

Further, an entity that forms a communication link to the electronic device 100 may include not only the service server 250 but also other electronic devices that are different from the electronic device 100.

The electronic device 100 may transmit the application information or the application information and the session information to the network 203. In the network 203, the application information or the session information may be transmitted to the control server 200 through relay of the gateway 240 and the base station 205 or packet detection of the gateway 240. The control server 200 may determine a quality policy on the basis of the application information or the session information. The control server 200 may control the traffic flow of the network session according to the quality policy. For example, the control server 200 may transmit the quality policy to the gateway 240 that belongs to the network 203 together with the control server 200 so that the traffic flow of the network session is controlled according to the quality policy in the gateway 240. Further, the control server 200 may operate to transmit the quality policy to the electronic device 100 so that the traffic flow of the network session is controlled according to the quality policy in the electronic device 100.

Figure 3:
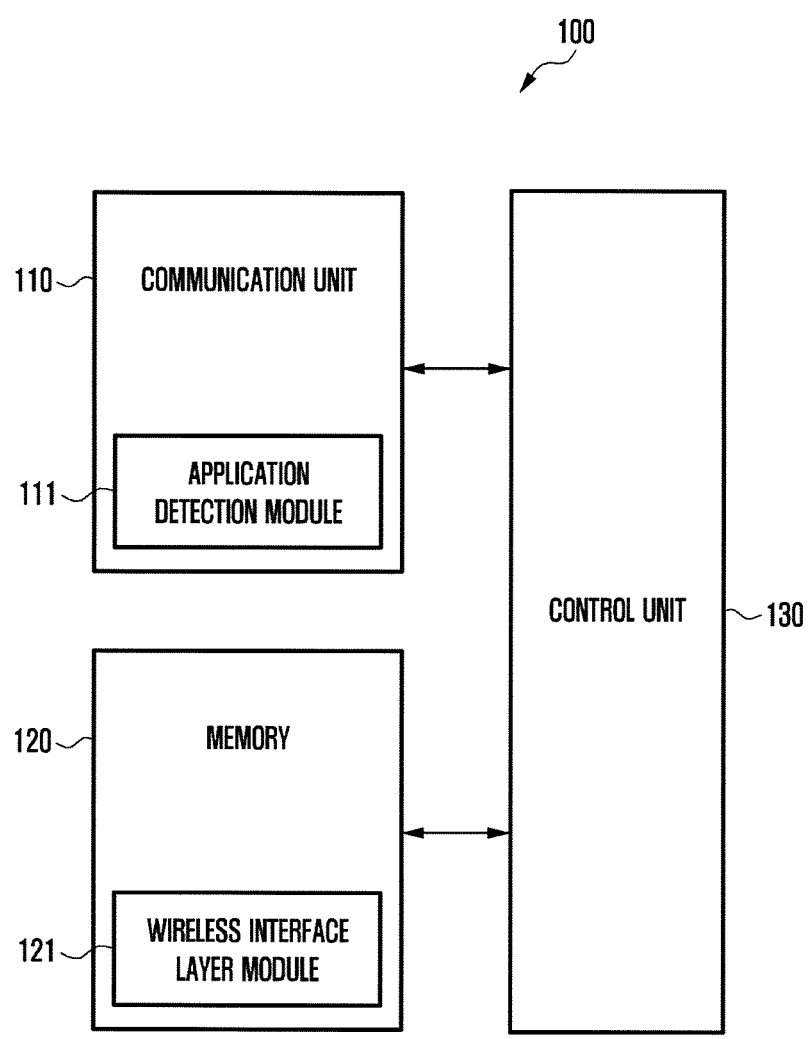
FIG. 3 is an exemplary diagram illustrating an electronic device according to an embodiment of the present invention.

FIG. 3 is an exemplary diagram illustrating an electronic device according to an embodiment of the present invention.

The electronic device 100 may include at least one of a control unit 130 and a communication unit 110.

The control unit 130 may acquire application information of an application that corresponds to the networks session. The communication unit 110 may transmit the application information to the control server. Further, the communication unit 110 may transmit network session information of the network session to the control server together with the application information. Further, the control unit 130 may operate to perform communication for the application using the traffic flow of the network session that is controlled on the basis of the application information. Here, the traffic flow may be controlled according to the quality policy that is determined on the basis of the application information. The application information may include at least one of an application identifier, category, and QoS.

Further, the traffic flow may be controlled according to the quality policy in the gateway in the case where the control server transmits the quality policy that is determined on the basis of the application information in the control server to the gateway that belongs to the network together with the control server.

Further, the communication unit 110 may receive the quality policy that is determined on the basis of the application information from the control server, and the traffic flow may be controlled according to the quality policy in the electronic device 100.

Further, in order to transmit the application information to the control server, the communication unit 110 may transmit a radio resource control message that includes the application information, a non-access stratum message, or a data packet to the network to make the application information acquired in the control server.

Further, in order to form the network session between the electronic device 100 and the service server, the control unit 130 may acquire the application information when a transmission packet that is to be transmitted to the service server is generated or a reception packet is received from the service server.

Further, the control unit 130 may acquire the application information by detecting the process identifier that corresponds to the network session using the operating system of the electronic device 100 and detecting the application information that corresponds to the process identifier. For example, the application information may be the application identifier.

Further, the electronic device 100 may further include a memory 120 for storing a wireless interface layer module 121. If the wireless interface layer module 121 is loaded by the control unit 130, it may be located on a functional layer of the operating system to perform a task for acquiring the application information.

Hereinafter, acquisition of the application information through the electronic device 100 that includes the communication unit 110, the memory 120, and the control unit 130 will be described.

In an aspect of the present invention, the communication unit 110 may include an application detection module 111. If the network session is generated, the application detection module 111 may request the process identifier that corresponds to the network session from the control unit 130, and may receive the process identifier from the control unit 130. If the process identifier is received from the control unit 130, the application detection module 111 may request the application information that corresponds to the process identifier, and may acquire the application information that corresponds to the process identifier through reception of the application information from the control unit 130.

Further, if the communication unit 110 requests the process identifier, the control unit 130 may detect the process identifier that corresponds to the network session using the wireless interface layer module 121 and may transmit the detected process identifier to the communication unit 110. If the communication unit 110 requests the application information, the control unit 130 may detect the application information that corresponds to the process identifier and may transmit the detected application information to the communication unit 110.

In another aspect of the present invention, the communication unit 110 may include the application detection module 111. If the network session is generated, the application detection module 111 may request the application information that corresponds to the process identifier from the control unit 130, and may acquire the application information that corresponds to the network session through reception of the application information from the control unit 130.

Further, if the communication unit 110 requests the application information, the control unit 130 may detect the process identifier that corresponds to the network session using the wireless interface layer module and may detect the application information that corresponds to the detected process identifier. The control unit 130 may transmit the detected application information to the communication unit 110.

In still another aspect of the present invention, the memory 120 may store the wireless interface layer module 121 and a network stack (not illustrated) therein. If the wireless interface layer module 121 is loaded by the control unit 130, it may be located on the functional layer of the operating system to perform a task for acquiring the application information. If the network session is generated, the network stack may notify the wireless interface layer module 121 of the generation of a new network session.

Further, the communication unit 110 may include the application detection module 111 that acquires the application information that corresponds to the network session through reception of the application information from the control unit 130. If the generation of the new network session is notified, the control unit 130 may detect the process identifier that corresponds to the network session and may detect the application information that corresponds to the detected process identifier using the wireless interface layer module 121 and the network stack. The control unit 130 may transmit the detected application information to the communication unit 110.

It is to be noted that the acquisition of the application information in the electronic device 100 is not limited to the above-described embodiment, but can be performed in accordance with various functional modules and modified procedures.

For example, in the case where the electronic device 100 is implemented by a modem chip, dongle, or card type, the electronic device 100 may include the communication unit 110. In this case, if the electronic device 100 is mounted on or connected to another electronic device, the communication unit 110 operates together with a control unit or a memory that is included in the other electronic device, and thus the traffic quality can be controlled as described above.

Hereinafter, referring to FIGS. 4, 5, and 8 to 13, an electronic device according to an aspect of the present invention will be described in more detail.

Figure 4:
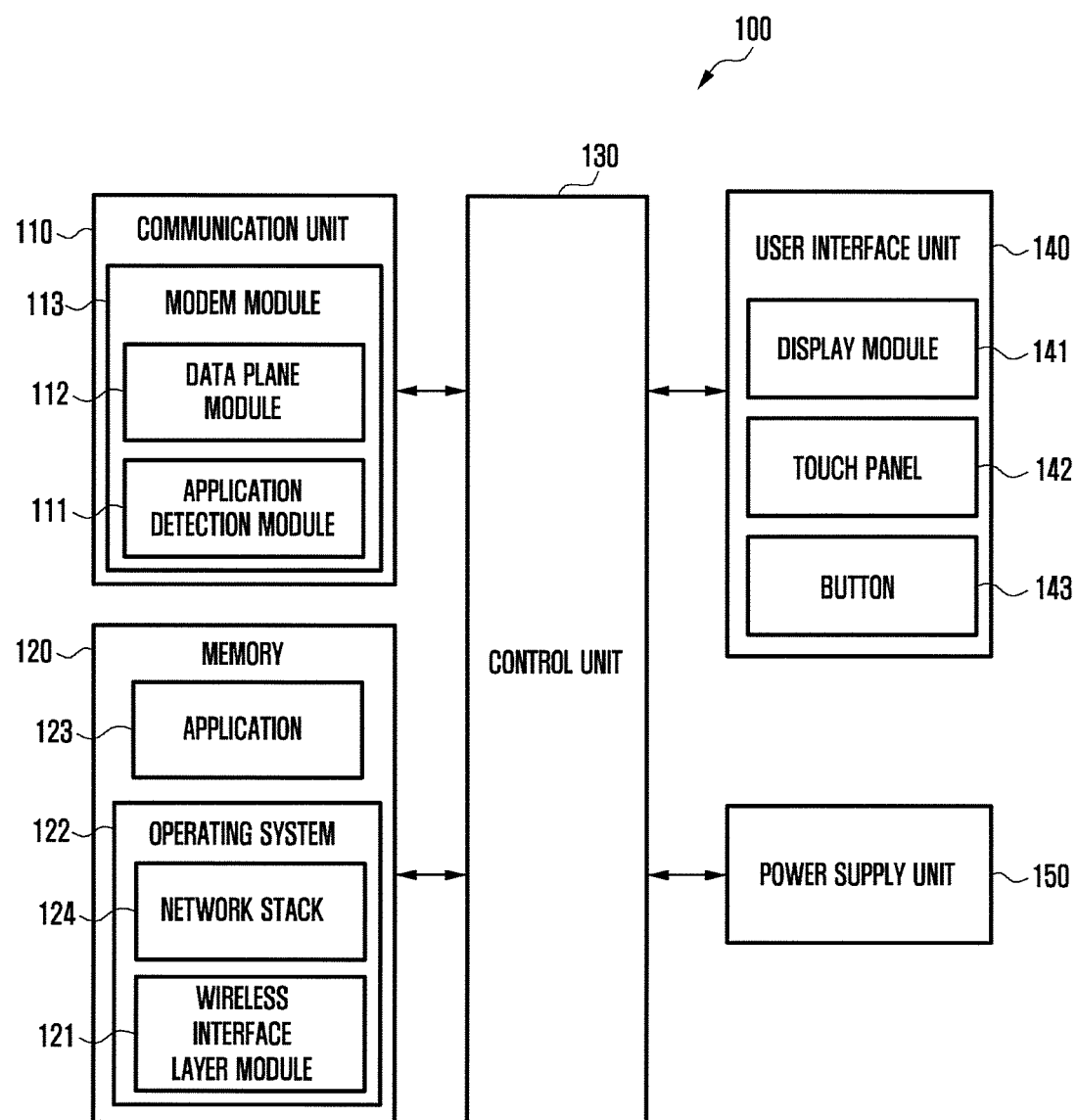
FIG. 4 is another exemplary diagram illustrating, in more detail, an electronic device in more detail according to an embodiment of the present invention.

Referring to FIG. 4, for example, the electronic device 100 may be a portable terminal that can install and drive at least one application through the operating system.

The electronic device 100 may include the control unit 130 and the communication unit 110. Further, the electronic device 100 may further include the memory 120. Further, the electronic device may further include a user interface unit 140 and a power supply unit 150.

The communication unit 110 may transmit the application information to the control server. Further, the communication unit 110 may transmit the network session information of the networks session and the application information that corresponds to the network session to the control server. Further, in order to transmit the application information to the control server, the communication unit 110 may transmit the radio resource control message that includes the application information, the non-access stratum message, or the data packet to the network to make the application information acquired in the control server.

The communication unit 110 may support a mobile communication system, a near field communication system, or a wired communication system. For example, the communication unit 110 may include standard-based communication modules, such as TDM, TDMA, FDM, FDMA, CDM, CDMA, OFDM, OFDMA, MIMO, GSM using a technology, such as a smart antenna, WCDMA, HSDPA, LIE, and WiMAX. Further, the communication unit 110 may include a near field communication type communication module, such as WiFi, Bluetooth, Zigbee, Infrared Data Association (IrDA), RF-ID, or Near Field Communication (NFC), or a wired communication module, such as Local Area Network (LAN).

Further, the communication unit 110 may include the application detection module 111. Further, the communication module 110 may include a modem module 113. The modem module 113 may be implemented by a modem chip or an electronic circuit having a modem function. Further, the modem module 113 may be configured by software, hardware, or a combination thereof. The modem module 113 may include the application detection module 111 or a data plane module 112.

Further, the application detection module 111 or the data plane module 112 may be included in the memory 120. A communication processor included in the communication unit 110 may access the application detection module 111 or the data plane module 112 from the memory 120 to control the corresponding module to perform the task.

The control unit 130 may acquire the application information of the application that corresponds to the network session. The control unit 130 may operate to perform communication with the application using the traffic flow of the network session that is controlled on the basis of the application information.

The control unit 130 may include a Central Processing Unit (CPU), a ROM in which control programs for controlling the electronic device 100 are stored, and a RAM that stores signals or data input from an outside of the electronic device 100 or that is used as a storage region for tasks performed in the electronic device 100. The CPU may include not only a single core but also a multi-core, such as dual-core, quad-core, or octa-core. The CPU, the ROM, and the RAM may be connected to one another through an internal bus or may be implemented in the form of a chip or a module.

The memory 120 may include the wireless interface layer module 121. Further, the memory 120 may include the operating system 122 and an application 123. The operating system 122 may include the wireless interface layer module 121 and a network stack 124. Further, the wireless interface layer module 121 may not be included in the operation system 122. Further, in the case where the wireless interface layer module 121 is loaded by the control unit 130, it may be a module that is located on the functional layer of the operating system 122.

Further, the memory 120 may store signals or data that are input/output corresponding to the operation of the communication unit 110 or the user interface unit 140 under the control of the control unit 130. Further, the memory 120 may store control programs and applications for the overall control of the electronic device 100 or the control of the control unit 130.

Further, the memory 120 may include a ROM in the control unit 130, a RAM, or a memory card (e.g., SD card or memory stick) that is mounted on the electronic device 100. The memory 120 may include a nonvolatile memory, a volatile memory, a Hard Disc Drive (HDD), or a Solid State Drive (SSD).

Further, the memory 120 may store images for providing applications having various functions and Graphic User Interfaces (GUIs) related to the applications, databases or data related to methods for processing user information, documents, and touch inputs, background images (menu screens and standby screens) or operating programs required to drive the electronic device 100, and data acquired from the outside.

Further, the memory 120 may include a machine (e.g., computer) readable medium. The memory 120 may access information from the machine readable medium and may store the accessed information under the control of the control unit 130. The machine readable medium may be a medium that provides data to the machine so that the machine can perform a specific function. For example, the machine readable medium may be a storage medium. The machine readable medium may include at least one of a floppy disc, a flexible disk, a hard disc, a magnetic type, a Compact Disc Read-Only Memory (CD-ROM), an optical disk, a punch card, a paper tape, a RAM, a Programmable Read-Only Memory (PROM), an Erasable PROM (EPROM), and a flash-EPROM, but is not limited thereto.

The user interface unit 140 may provide a user with a user interface for requesting designation of the category of the application. The user interface may be provided to the user visually, aurally, and tactilely. The user interface unit 140 may receive a user input that indicates the designation of the category of the application through the user interface. The user input may be a touch input, a button input, a motion input, or a voice input.

The user interface unit 140 may include a display module 141, a touch panel 142, and a button 143.

The display module 141 may include at least one of a Liquid Crystal Display (LCD), a thin film transistor-liquid crystal display, an organic light emitting diode, a flexible display, a 3D display, and an electrophoretic display.

The touch panel 142 may be implemented by a resistive type, a capacitive type, an Electronic Magnetic Resonance (EMR) type, an infrared type, or an acoustic wave type.

The display module 141 and the touch panel 142 may be combined with each other to operate as a touch screen. In this case, the user interface unit 140 may further include a touch screen controller. The touch screen may receive an input of at least one touch through a user's body (e.g., fingers including a thumb) or a touchable input unit. Further, the touch screen may include a pen recognition panel that can recognize an input through a pen, such as a stylus pen or an electronic pen. Further, the touch screen may be formed to have a structure in which a panel that senses an input by a finger or an input unit through a change of induced EMF, a display panel, and a panel that senses contact of a finger or an input unit on the touch screen through a change of resistance or capacitance are stacked in order in a state where the panels come in close contact with one another or the panels are partially spaced apart from one another. A touch screen controller may convert an analog signal that is received on the touch screen into a digital signal (e.g., X and Y coordinates) to transmit the converted signal to the control unit 130. The control unit 130 may control the touch screen using the digital signal received from the touch screen controller. Further, the touch screen controller may be included in the control unit 130.

The button 143 may receive a button (or key) input from a user for the control of the electronic device 100. The button 143 may include a physical button (or key) that is formed on the electronic device 100, and a virtual button or a virtual keypad displayed on the touch screen. The physical keypad that is formed on the electronic device 100 may be excluded in accordance with the structure of the electronic device 100.

Further, the electronic device 100 may further include a sensor unit (not illustrated) for receiving a motion input. The sensor unit may include a camera, a motion sensor, or an illumination sensor.

The power supply unit 150 may include at least one battery (not illustrated) arranged in a housing of the electronic device 100, a power supply circuit, or a battery charging circuit according to the control of the control unit 130. The power supply unit 150 may supply a power to the electronic device 100. Further, the power supply unit 150 may operate to supply a power that is input from an external power source (not illustrated) through a wire cable connected to a connector to the constituent modules or the battery of the electronic device 100. Further, the power supply unit 150 may operate to supply the power that is wirelessly input from the external power source through wireless charging technology to the constituent modules of the electronic device 100 or to charge the battery.

Figure 5:
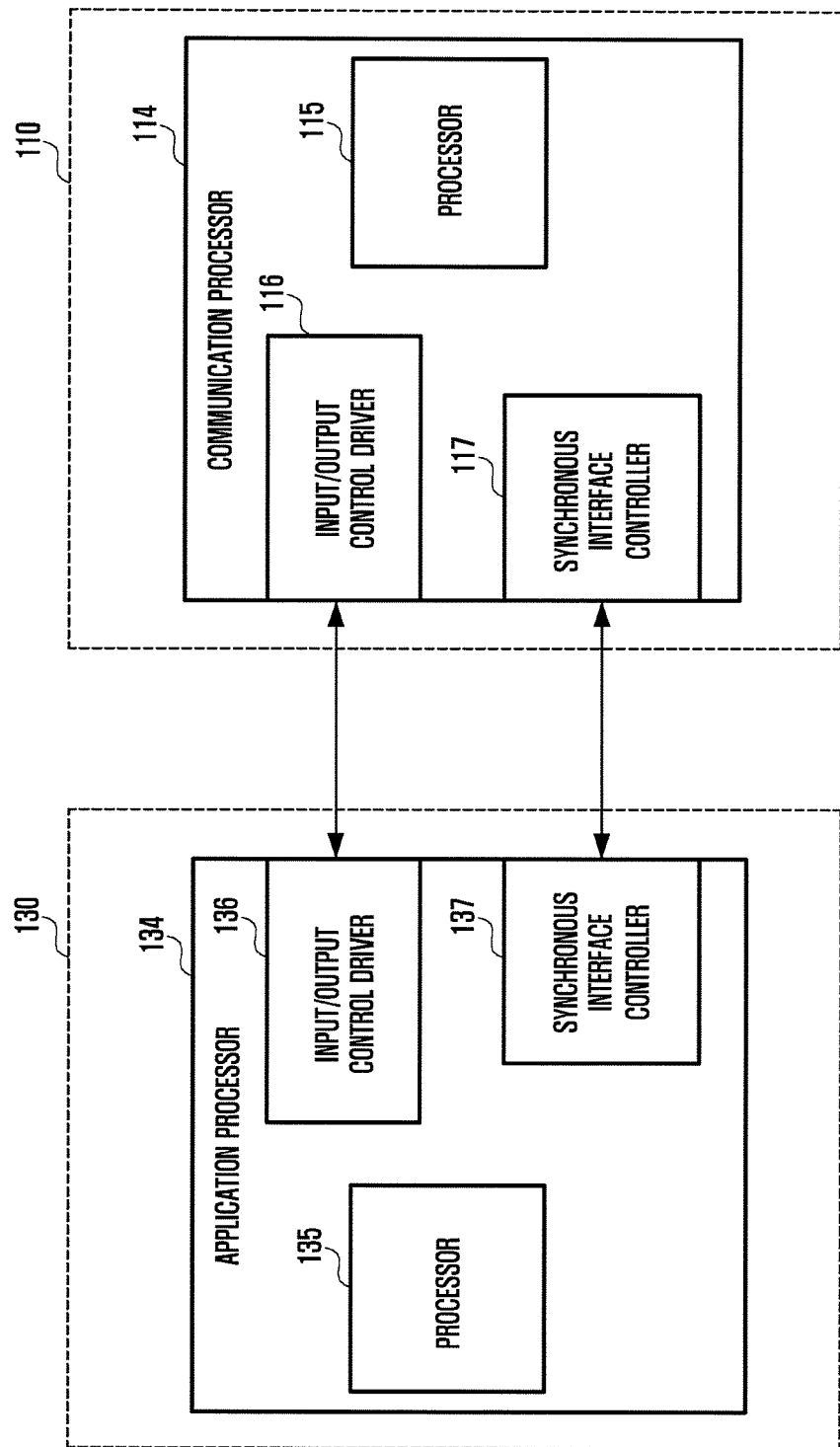
FIG. 5 is an exemplary diagram illustrating a control unit and a communication unit in an electronic device according to an embodiment of the present invention.

Referring to FIG. 5, an example of the interface between the control unit 130 and the communication unit 110 in the electronic device 100 will be described.

The control unit 130 may include an application processor 134. The application processor 134 may include a processor 135, an input/output control driver 136, and a synchronous interface controller 137. The communication unit 110 may include a communication processor 114. The communication processor 114 may include a processor 115, an input/output control driver 116, and a synchronous interface controller 117.

For example, the input/output control driver 116 or 136 may be a General Purpose Input/Output (GPIO) control driver, and the input/output control driver 116 and the input/output control driver 136 may be connected to each other through a GPIO line. The synchronous interface controller 117 or 137 may be High speed Synchronous Interface (HIS) controller, and the synchronous interface controller 117 and the synchronous interface controller 137 may be connected to each other through a HIS line.

Further, the communication processor 114 may be included in the control unit 130, or a processor in which functions of the communication processor 114 and the application processor 134 are combined may be included in the control unit 130.

Figure 8:
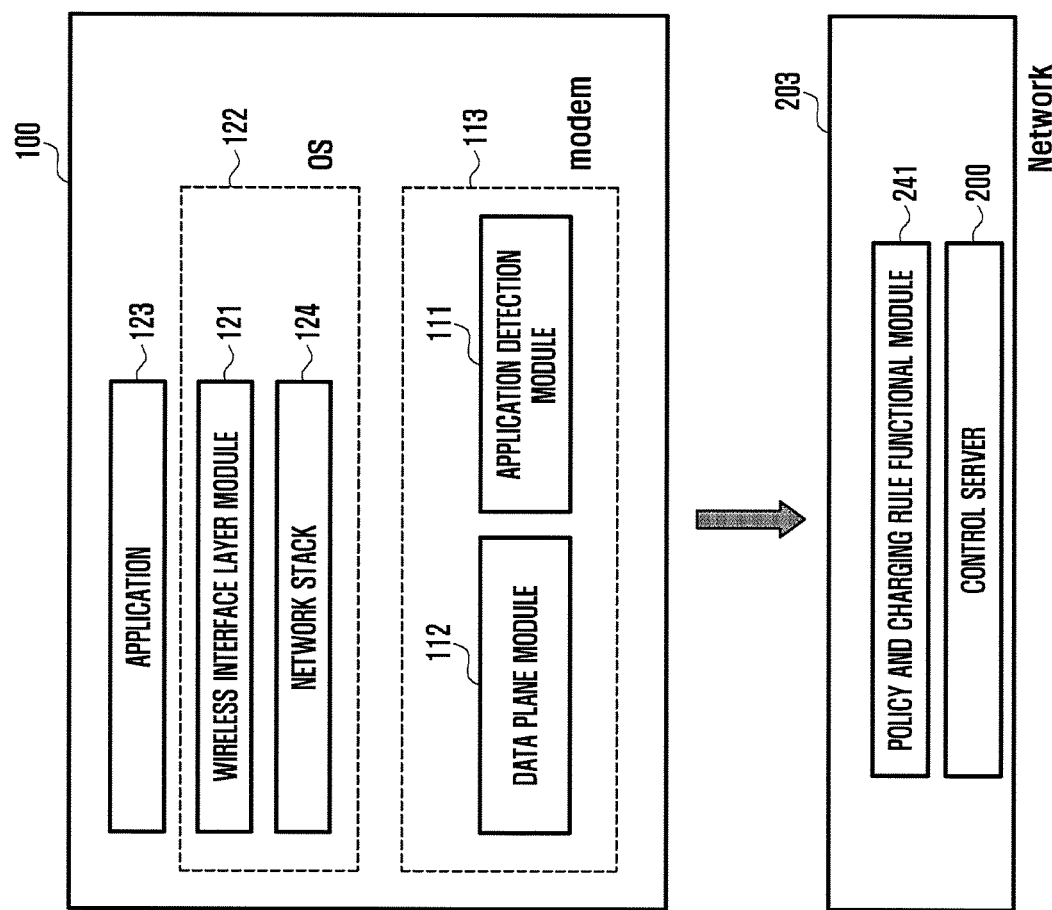
FIG. 8 is an exemplary diagram explaining functions of an electronic device and a control server according to an embodiment of the present invention.

Referring to FIG. 8, constituent elements of the electronic device 100, functional modules, and functional layers or software modules will be described.

The modem module 113 may include the data plane module 112 and the application detection module 111. The operating system 122 may include the wireless interface layer module 121 and the network stack 124. The operating system 122 illustrated in FIG. 8 may be a functional module or a functional layer model that is loaded by the control unit 130 of the electronic device 100 to perform a task for the system operation.

Further, the operating system 122 may include a framework, libraries, and a kernel. The network stack 124 may be communication packet driver that supports protocols of TCP, IP, and UDP. As an example, the network stack 124 may be located on a kernel functional layer, such as Linux. The wireless interface layer module 121 may be located on a library functional layer.

Further, the operating system 122 may include various types of platforms or operating systems, such as Android of Google Company, iOS of Apple Inc., Windows of Microsoft Corporation, Symbian, BlackBerry of Research In Motion Limited, Bala of Samsung Electronics Co., Ltd., and Tizen.

The application 123 may be driven by the control unit 130 to provide a communication service to a user. Further, the control unit 130 may operate to form a communication link through the application 123 or to make signals or data transmitted/received on the basis of the communication link.

In order to form the network session between the electronic device 100 and the service server (or another electronic device), the control unit 130 may acquire the application information when a transmission packet to be transmitted to the service server is generated or a reception packet is received from the service server (or another electronic device).

For example, if the application 123 is driven by the control unit 130, the transmission packet that includes new network session information may be generated in the network stack 124 of the operating system to perform the communication service. Further, if the reception packet that includes new network session information is received from the service server, the control unit 130 may operate to process the reception packet using the network stack 124 of the operating system 122.

If a packet that includes new network session information is generated or a new network session is generated, the control unit 130 may operate to store a session mapping table that indicates mapping information between the network session information and the process identifier in the memory 120 or to update the session mapping table stored in the memory 120 in order to process the network session through the operating system 122. The control unit 130 may perform transmission/reception process by network sessions using the session mapping table, and thus signal transmission/reception may be discriminated according to a bearer. Further, if a packet is received or a packet is generated, the control unit 130 may manage which process the corresponding packet is copied into in the functional layer of the operating system 122 using the session mapping table. For example, referring to FIG. 10, a list 1010 may be an example in which the received or generated data packets are copied into the memory 120 in accordance with the corresponding process. Network session information 1030 of the packets may be mapped on the corresponding process identifiers 1020. At least one piece of network session information 1030 may be mapped on the process identifier 1020.

Further, the control unit 130 may operate to store an application mapping table that indicates application identifiers (or application information) and process identifiers in the memory 120 or to update the application mapping table stored in the memory 120 through the operating system 122. The control unit 130 may manage the process, in which if the process performs an abnormal operation, the corresponding application is ended, using the application mapping table. For example, referring to FIG. 10, a list 1050 may be an example that indicates application information that corresponds to a process that is being processed or that is in a standby state. The process identifiers 1060 may correspond to the application identifiers (or application information) 1070. Further, at least one process identifier may be mapped on the application identifier.

The data plane module 112 may confirm whether a new network session is generated through reception of a packet that includes network session information from the network stack 124. In order to manage the network session, the modem module 113 may operate to store the network session information that is currently maintained or that is to be formed in a flow table. The network session information may include a source Internet Protocol (IP) address, a destination IP address, a source port, a destination port, or protocol information.

The data plane module 112 may recognize the generation of a new network session through detection of whether the network session information of the received packet is not included in the stored flow table or is the network session information that is newly added to the flow table. If the new network session is generated, the data plane module 112 may transmit the new network session information to the application detection module 111. For example, referring to FIG. 9, in the case where a destination IP address "x1" and a destination port "y1" are added to a flow table 910 as new network session information, the data plane module 112 may transmit the new network session information that includes the destination IP address "x1" and the destination port "y1" to the application detection module 111.

The application detection module 111 may request a process identifier or application information that corresponds to new network session information from the wireless interface layer module 121. For example, referring to FIG. 9, network session information and a process identifier may be included in a session mapping table 920 that is managed in the functional layer of the operating system 122. The wireless interface layer module 121 may detect a process identifier "232" that corresponds to the destination IP address "x1" and the destination port "y1" with reference to the session mapping table 920. Further, in order to transmit control information between the application detection module 111 and the wireless interface layer module 121, a new command or query may be necessary or the existing command or query may be used. As an example, a command or a query may be newly defined, which requests or transmits/receives a process identifier or application information between a baseband functional layer on which the modem module 113 operates and a wireless interface layer that belongs to the functional layer of the operating system 122 on which the wireless interface layer module 121 operates.

Figure 9:
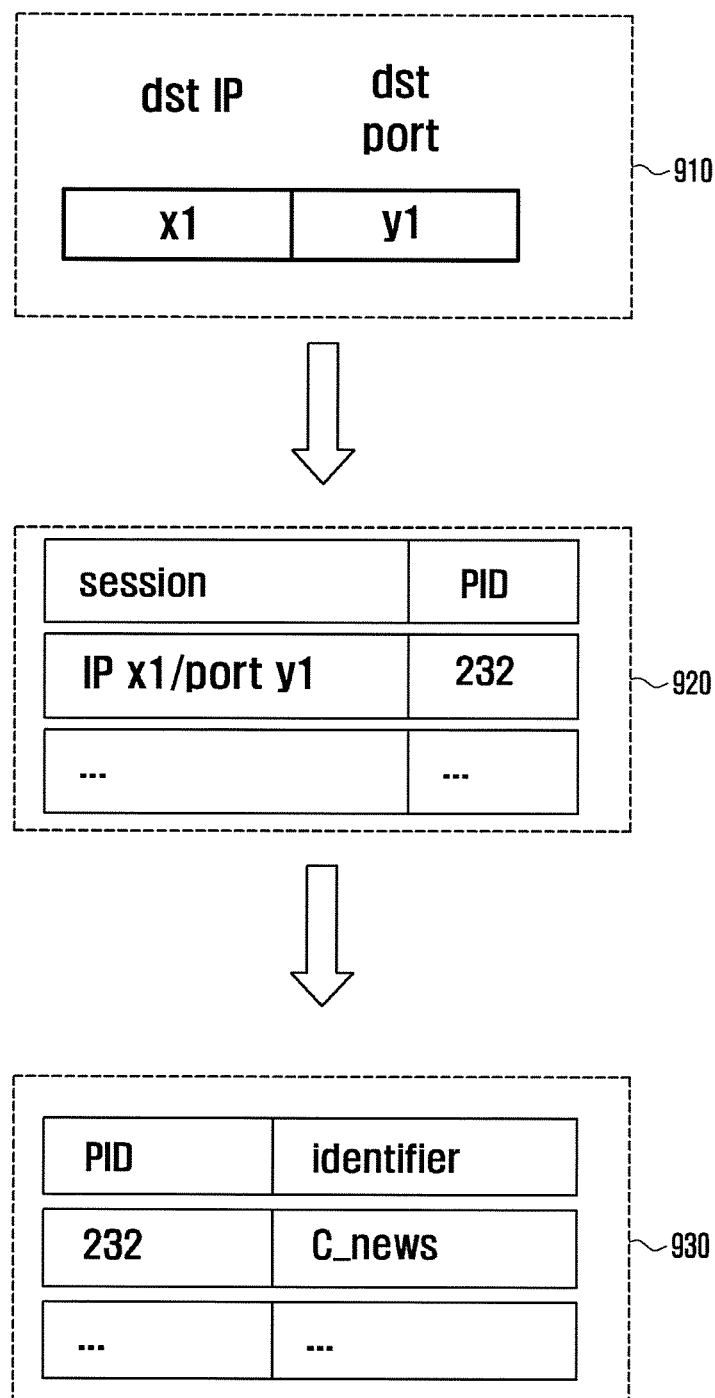
FIG. 9 is an exemplary diagram explaining the concept of acquisition of application information using network session information according to an embodiment of the present invention.

For example, referring to FIG. 9, at least one of a process identifier and an application identifier (or application information) may be included in an application mapping table 930 that is managed on the functional layer of the operating system 122. The wireless interface layer module 121 may detect the application identifier "C_news" that corresponds to the process identifier "232" with reference to the application mapping table 930. The application identifier is a package name that is determined for each application by an application developer of the electronic device 100, and the application identifier may be an identifier that is adjusted to avoid duplication between the identifiers when the application identifier is registered in an application market. An application package name or an application identifier may be included in an application source code. When the application 123 is executed, the operating system 122 can recognize the application identifier.

The wireless interface layer module 121 may transmit information of the operating system 122 to the modem module 113. The wireless interface layer module 121 may transmit the process identifier or the application information that corresponds to new network session information.

The application detection module 111 may acquire the application information of a new network session through reception of the application identifier that corresponds to the new network session information from the wireless interface layer module 121. The application detection module 111 may transmit the network session information or the application information to the network 203.

The application information that is transmitted to the network 203 may include at least one of the application identifier, the category of an application, and QoS information. For example, the application identifier may be determined by a developer of the application, and when the application is registered in the application market server, the application identifier may be registered in the application market server after passing through an inspection to avoid duplication between the application identifier and the existing application identifier. The category may be information for predicting the traffic feature of an application, such as messenger, P2P, FTP, game, SNS, system tool, or office or the required QoS. The QoS may include at least one of packet transmission priority, frequency bandwidth information, transmission rate information, and buffering permission time information.

If the application information is received, the network 203 may control or manage the traffic flow of the network session that corresponds to the application information in accordance with the feature of the application.

Figure 12:
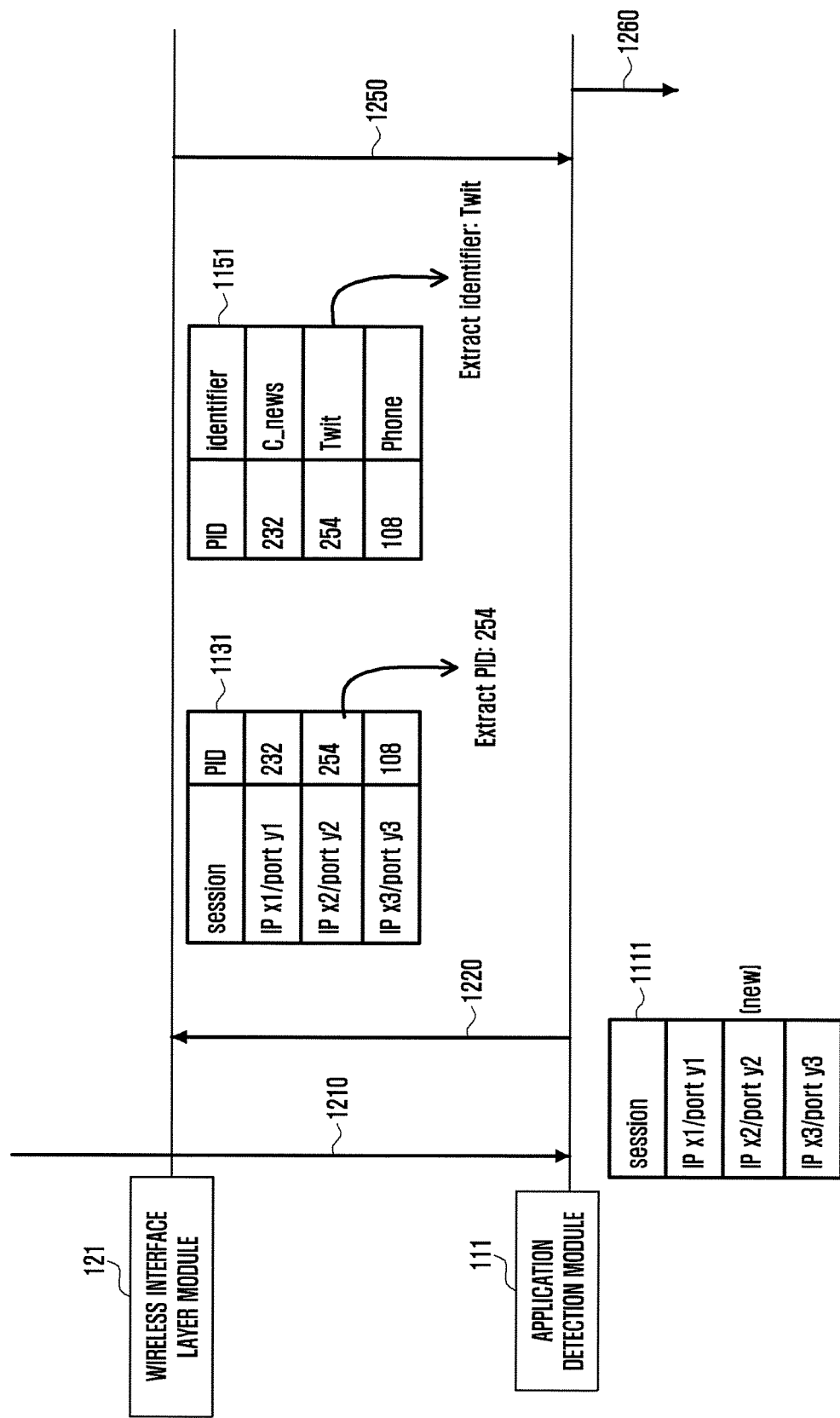
FIG. 12 is another exemplary diagram explaining a procedure of acquiring application information in an electronic device according to an embodiment of the present invention.
Figure 13:
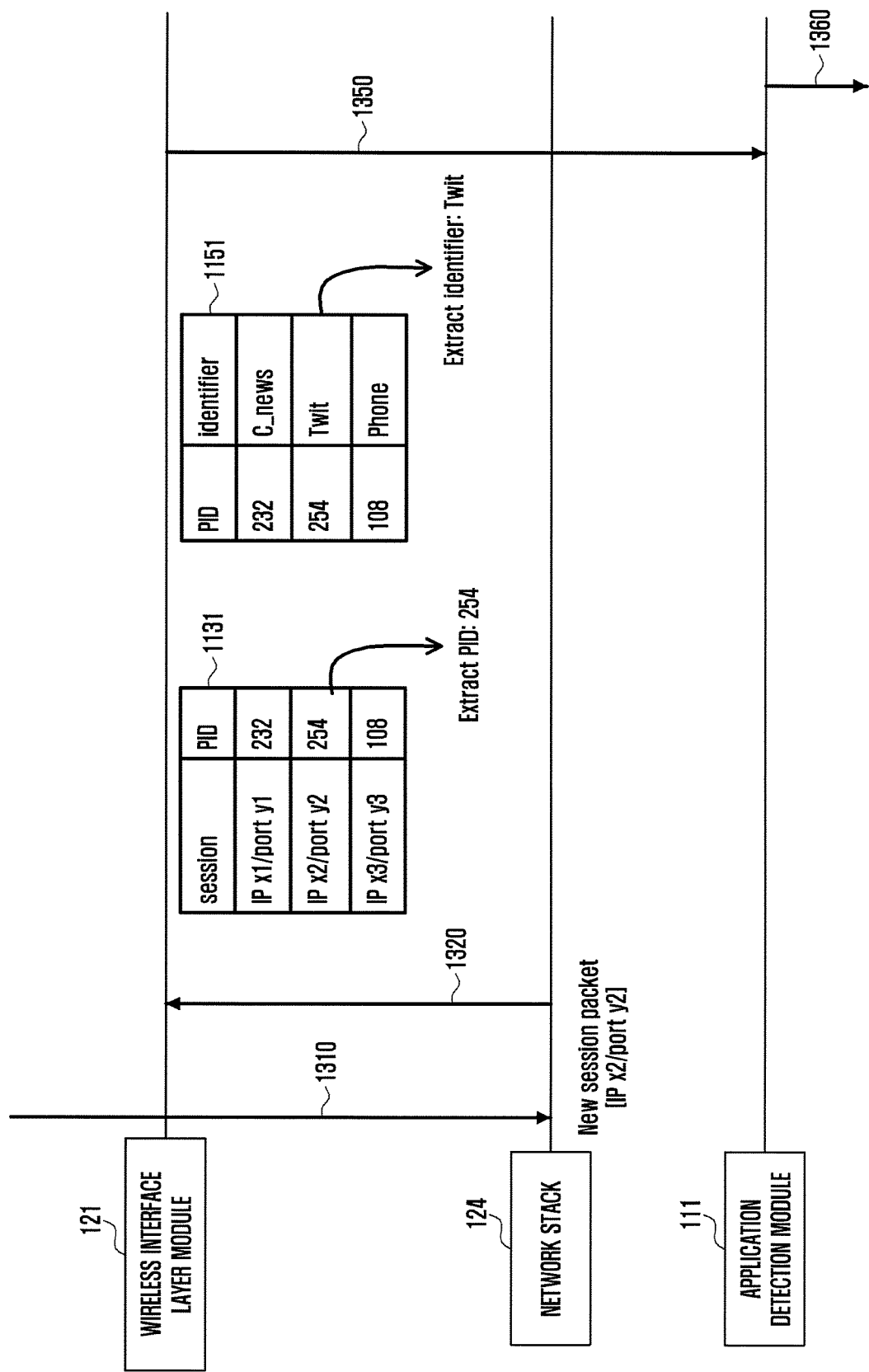
FIG. 13 is still another exemplary diagram explaining a procedure of acquiring application information in an electronic device according to an embodiment of the present invention.

Referring to FIGS. 11 to 13, a process of acquiring the application information in the communication unit 110 will be described in more detail.

For example, at operation 1110 of FIG. 11, the communication unit 110 may receive a packet that includes new network session information from the control unit 130 that loads and processes the operating system 122 or the network stack 124. If a new network session is generated, new network session information that includes at least one of a destination IP address "x2" and a destination port "y2" may be added to a flow table 1111.

At operation 1120, the application detection module 111 that is included in the communication unit 110 may request the process identifier that corresponds to the new network session information from the control unit 130. The control unit 130 may load the wireless interface layer module 121 and may perform related function. If a request for the process identifier is received, the control unit 130 may detect a process identifier "254" that corresponds to the new network session information with reference to a session mapping table 1131 through the wireless interface layer module 121.

At operation 1130, the control unit 130 may transmit the detected process identifier to the communication unit 110.

At operation 1140, the application detection module 111 may request the application identifier that corresponds to the received process identifier from the control unit 130. If the request for the application identifier is received, the control unit 130 may detect the application identifier "Twit" that corresponds to the process identifier with reference to an application mapping table 1151.

At operation 1150, the control unit 130 may transmit the detected application identifier to the communication unit 110.

At operation 1160, the communication unit 110 may transmit the application information that includes the application identifier or the network session information to the network 203 or the control server 200.

For example, at operation 1210 of FIG. 12, the communication unit 110 may receive a packet that includes new network session information from the control unit 130. If a new network session is generated, the new network session information may be added to the flow table 1111.

At operation 1220, the application detection module 111 that is included in the communication unit 110 may request the application identifier that corresponds to the new network session information from the control unit 130. If a request for the application identifier is received, the control unit 130 may detect a process identifier that corresponds to the new network session information with reference to the session mapping table 1131 through the wireless interface layer module 121.

At operation 1250, the control unit 130 may transmit the detected application identifier to the communication unit 110.

At operation 1260, the communication unit 110 may transmit the application information or the network session information to the network 203 or the control server 200.

For example, at operation 1310 of FIG. 13, if the network stack 124 is loaded by the control unit 130, it may be located on the functional layer of the operating system 122 and may perform a task for detecting generation of a new network session packet.

If a new network session is generated, at operation 1320, the network stack 124 may notify that a new network session is generated through transmission of new network session information to the wireless interface layer module 121 that is driven by the control unit 130.

The control unit 130 may detect the process identifier that corresponds to the new network session information with reference to the session mapping table 1131 using the wireless interface layer module 121. Further, the control unit 130 may detect the application identifier that corresponds to the detected process identifier with reference to the application mapping table 1151.

At operation 1350, the control unit 130 may transmit the new network session information and the application identifier that corresponds to the new network session information to the communication unit 110.

At operation 1360, the application detection module 111 that is included in the communication unit 110 may transmit the application information or network session information to the network 203 or the control server 200.

Figure 6:
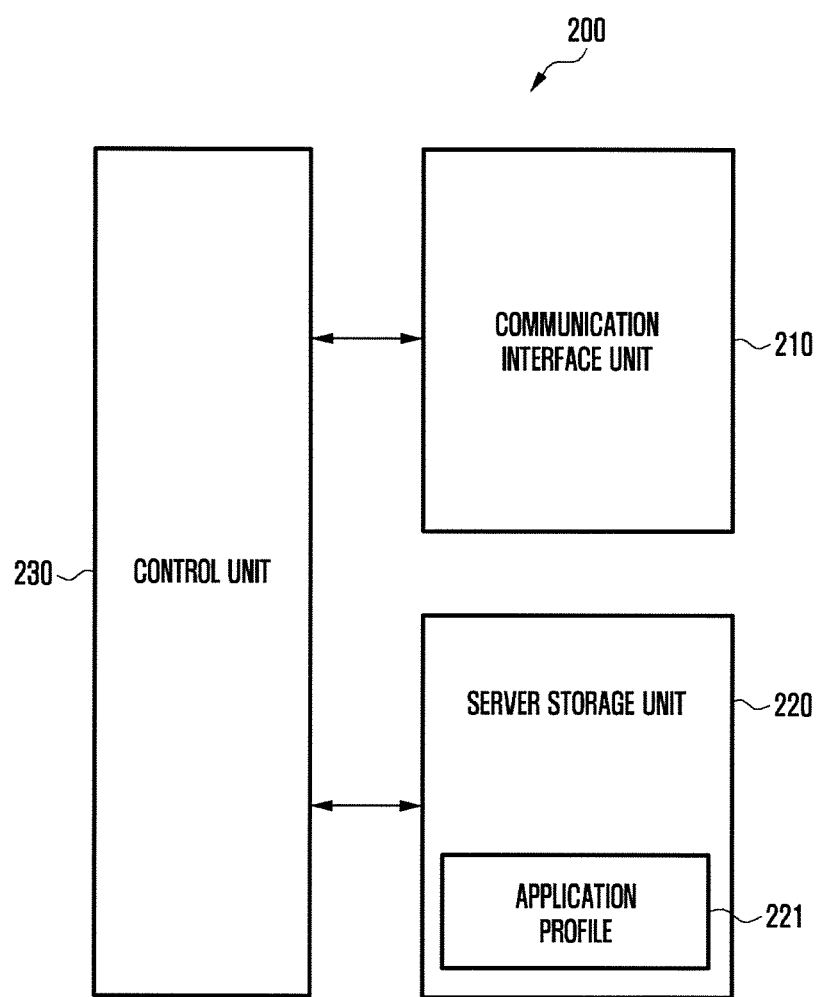
FIG. 6 is an exemplary diagram illustrating a control server according to an embodiment of the present invention.

FIG. 6 is an exemplary diagram illustrating a control server according to an embodiment of the present invention.

The control server 200 may include a communication interface unit 210 and a control unit 230.

The communication interface unit 210 may receive application information that indicates an application corresponding to a network session from the electronic device.

The control unit 230 may determine the quality policy on the basis of the application information, and may control the traffic flow of the network session according to the quality policy.

Further, the control unit 230 may operate to transmit the quality policy to a gateway that belongs to a network together with the control server 200, and thus the traffic flow of the network session may be controlled according to the quality policy in the gateway.

Further, the control unit 230 may operate to transmit the quality policy to the electronic device, and thus the traffic flow of the network session may be controlled according to the quality policy in the electronic device.

The control server 200 may further include a server storage unit 220. The server storage unit 220 may maintain an application profile 221 that includes information on the quality policy that corresponds to the application information.

The application profile 221 may include a QoS (or policy) that is required as the quality policy according to the application and an action in a network congestion state. Further, the application profile 221 may further include information on the traffic feature or traffic prediction for traffic prediction of the application. Further, the application profile 221 may include at least one index for selecting the required QoS, the action in the network congestion state, the traffic feature or the traffic prediction. The at least one index may be an application identifier, an application category, protocol information of the network session of the application, or a network congestion state (or the degree of network congestion).

Figure 23:
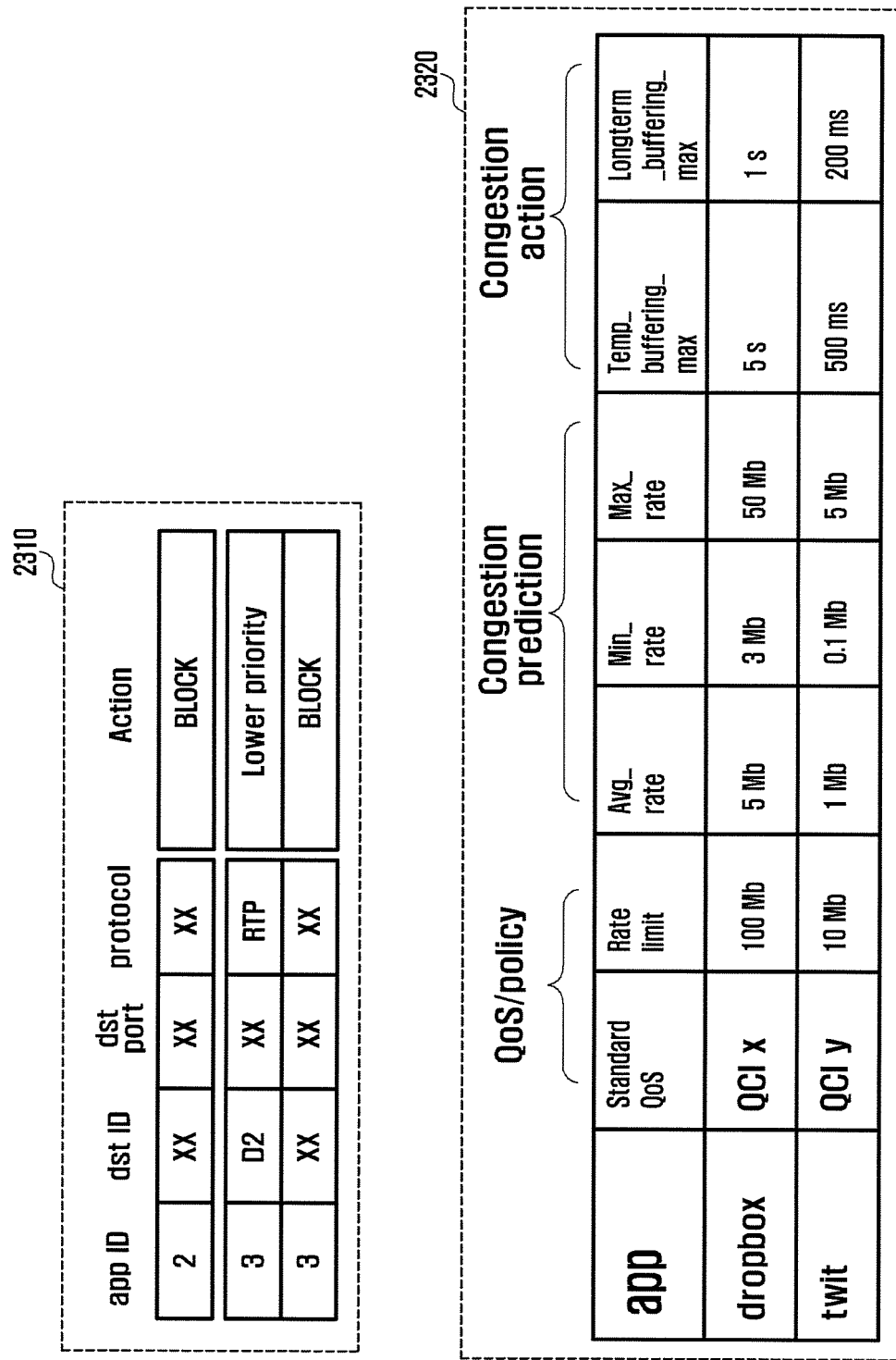
FIG. 23 is an exemplary diagram explaining the concept of a quality policy according to an embodiment of the present invention.

For example, referring to FIG. 23, the application profile 221 may include mapping tables 2310 and 2320 in which the required QoS (or policy) that corresponds to the corresponding application or protocol, the action in the network congestion state, the traffic feature, or the traffic prediction are stored together with the application identifier or the protocol. The required QoS or policy may be indicated as QoS Class Identifier (QCI) according to a predetermined QoS level. Further, the required QoS or policy may include a packet transmission priority or a transmission rate. The transmission rate may include, for example, a transmission rate limit value. The information on the traffic feature or the traffic prediction may include the transmission rate, and may be indicated, for example, as an average transmission rate, the minimum transmission rate, and the maximum transmission rate. The action in the network congestion state may include buffering permission time information or whether to block the packet transmission. The buffering permission time information may be indicated as at least one of the maximum temporary buffering time and the maximum long-term buffering time.

Further, the quality policy may be determined on the basis of the application information or the protocol information on the network session. For example, the communication interface unit 210 may receive, from the electronic device 100, the application identifier as the application information and the protocol information as the network session information. The control unit 230 may determine the quality policy that corresponds to the application identifier and the protocol information in the application profile 221 through an access of the application profile 221 that is stored in the sever storage unit 220. Further, in determining the quality policy, information on the network congestion state that is acquired through monitoring of the traffic flow may be required. For example, the action in the network congestion state may be control information for detecting the network congestion state if the current or predicted traffic volume is equal to or larger than a predetermined value (e.g., maximum traffic capacity) and performing a designated action (e.g., blocking of the packet transmission).

Further, the quality policy may be information of at least a part of the application profile 221. The quality policy may be information that is selected by at least one index among information included in the application profile 221.

Further, the control unit 230 may determine the quality policy for the traffic flow of the network session on the basis of the application category, the required QoS, or the network congestion state. The control server 200 may receive the application category or the required QoS from the electronic device as the application information.

Further, the control unit 230 may calculate at least one determination element with reference to the application information, the network session information, the network congestion state, and the application profile 221. The control unit 230 may acquire the quality policy that controls the traffic flow of the network session of the application through substitution of the at least one calculated determination element in a predetermined equation, a predetermined function, or a predetermined policy determination table.

Further, the quality policy may be information which is transmitted from the control server 200 to the gateway or the electronic device according to an event, such as the network congestion state, and is temporarily used only with respect to the event in the gateway or the electronic device. Further, the quality policy that is received in the gateway or the electronic device may be information that is continuously maintained to control the traffic quality until the quality policy according to the application information or the network session information is changed and application of a new quality policy is commanded from the control server 200 to the gateway or the electronic device.

Figure 7:
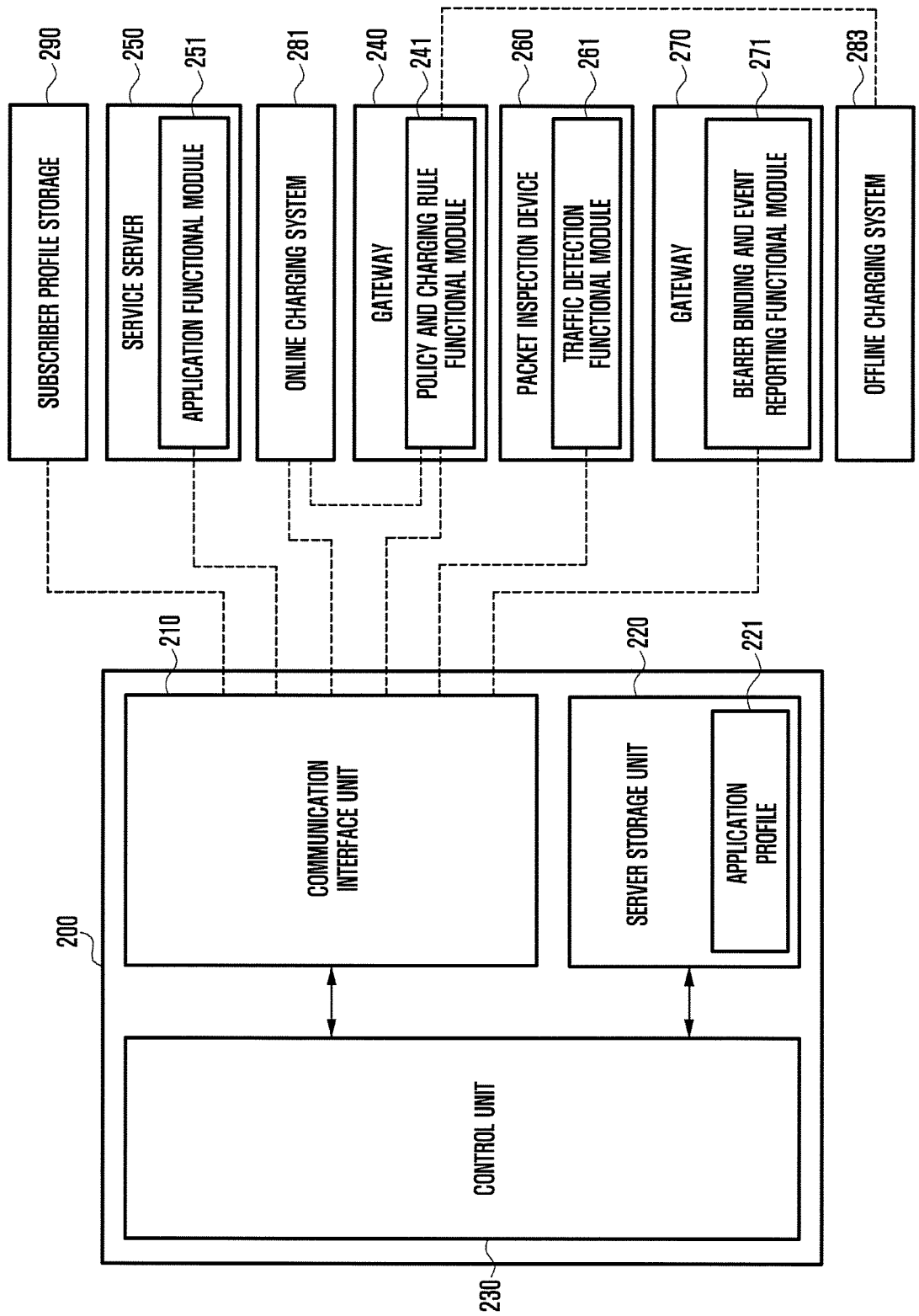
FIG. 7 is an exemplary diagram explaining functions of a control sever that communicates with peripheral devices according to an embodiment of the present invention.

FIG. 7 is an exemplary diagram explaining functions of a control sever that communicates with peripheral devices according to an embodiment of the present invention.

In the control server 200, the communication interface unit 210 may transmit/receive signals with the gateway 240. Referring to FIG. 8, the application information or the network session information that the electronic device 100 transmits to the network 203 may be transmitted to the communication interface unit 210 of the control server 200 through the gateway 240 that belongs to the network 203. The gateway 240 may include a Policy and Charging Enforcement Function (PCEF) module 241 which relays the received application information or network session information to the control server 200 or detects and transmits the application information or the network session information that is included in a data packet to the control server 200. For example, the gateway 240 may be a P-GW, and the PCEF module 241 may perform PCEF. Further, the gateway 240 may detect and transmit the network congestion state or the degree of congestion to the control server 200.

Further, if the quality policy is determined, the control unit 230 of the control server 200 may control the communication interface 210 to transmit the quality policy to the gateway 240. The PCEF module 241 of the gateway 240 may control the traffic flow of the network session according to the quality policy that is received from the control server 200.

Further, the PCEF module 241 may be connected to an online charging system 281 or an offline charging system 283. The PCEF module 241 may confirm and transmit a packet usage amount or a transmission speed to the online charging system 281 or the offline charging system 283. The PCEF module 241 may receive limited packet usage amount information from the online charging system 281 or the offline charging system 283 to limit the traffic. Further, the online charging system 281 may transmit the limited packet usage amount information or the required QoS according to charging to the control server 200, and the control server 200 may control the traffic flow according to the limited packet usage amount information or the required QoS through the gateway 240.

Further, the communication interface unit 210 may receive the application information from an application functional module 251 of the service server 250. The application information may include an application identifier, an application category, or required QoS. The control server 200 may update the application profile 221 using the application information. Further, the application functional module 251 may be included in an application market server (not illustrated).

A traffic detection functional module 261 may be included in a packet inspection device 260 or may be a separate module that is not related to the packet inspection device 260. The traffic detection functional module 261 may monitor the traffic and may transmit monitoring information to the control server 260. For example, the traffic detection functional module 261 may monitor the traffic feature (or pattern) of the network session of the application or may estimate the application information, such as the application category or the required QoS through analysis of the traffic feature. The communication interface unit 210 may receive the traffic feature or the application information from the traffic detection functional module 261. Further, the traffic detection functional module 261 may acquire information on the network congestion state or the degree of network congestion and may transmit the corresponding information to the communication interface unit 210.

Further, the communication interface unit 210 may receive the required QoS or policy that corresponds to a user (or subscriber) from a subscriber profile storage 290. Further, the control unit 230 of the control server 200 may determine the quality policy in consideration of the required QoS or policy by users received from the subscriber profile storage 290 together with the above-described determination elements.

Further, the gateway 270 may include a Bearer Binding and Event Reporting Function (BBERF) module 271, and the BBERF module 271 may transmit bearer biding information to the communication interface unit 210 of the control server 200 or may report the event that occurs in the gateway to the control server 200. For example, the gateway 270 may be a Serving Gateway (S-GW) or a Local Gateway (L-GW), and the BBERF module 271 may perform BBERF.

At least parts of the above-described devices or modules that can transmit/receive signals with the communication interface unit 210 may be included in the control server 200 or may be combined with the control server 200, or at least a partial function of the control server 200 may be separated as a module, and the separated module may be communication-connected to the communication interface unit 210. For example, the control server 200 may include a configuration in which the gateway 240 and the control server 200 are combined with each other, or the traffic detection functional module 261 may be included in the control server 200. Further, the application profile 221 or the server storage unit 220 may be a separate storage that is separated from the control server 200.

Referring to FIGS. 14 to 16 and 20 to 22, a method for controlling traffic quality in an electronic device will be described. As an example, the electronic device may be one as exemplified in FIG. 3 or 4.

Figure 14:
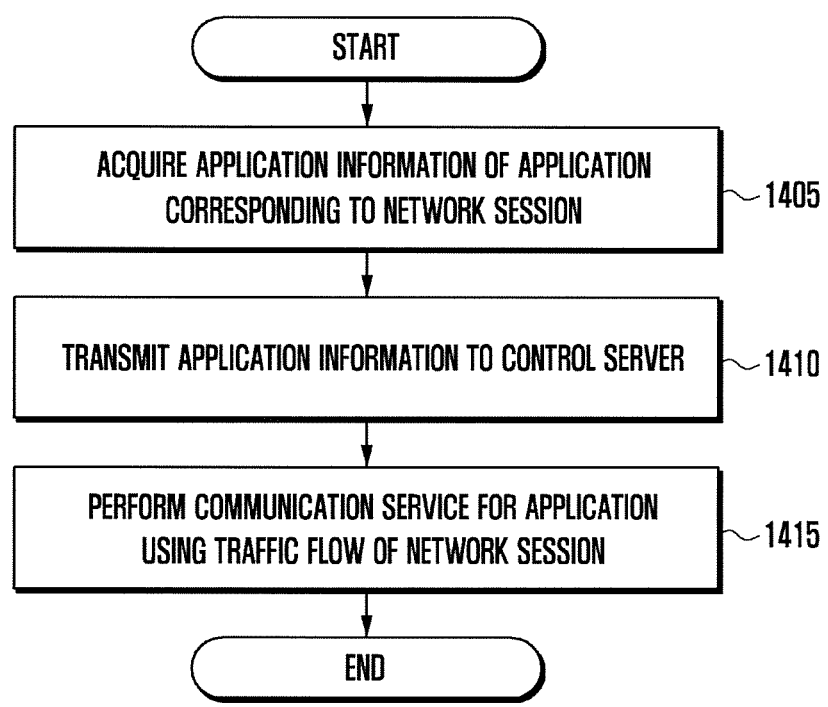
FIG. 14 is a flowchart illustrating a method for controlling traffic quality in an electronic device according to an embodiment of the present invention.

FIG. 14 is a flowchart illustrating a method for controlling traffic quality in an electronic device according to an embodiment of the present invention.

At operation 1405, the electronic device 100 may acquire application information of an application that corresponds to a network session.

At operation 1410, the electronic device 100 may transmit the application information to the control server. Further, the electronic device 100 may transmit network session information of the network session to a control server together with the application information.

At operation 1415, the electronic device 100 may perform communication (or communication service) for the application using a traffic flow of the network session that is controlled on the basis of the application information.

The traffic flow may be controlled according to a quality policy that is determined on the basis of the application information. The application information may include at least one of an application identifier of an application, an application category, and QoS. The quality policy may include at least one of whether to block packet transmission, frequency bandwidth information, transmission rate information, buffering permission time information, and packet transmission priority.

The traffic flow may be controlled according to the quality policy that is determined on the basis of the application information in the control server. Further, the quality policy may be determined on the basis of the application information and protocol information of the network session.

The traffic flow may be controlled according to the quality policy in the gateway in the case where the control server transmits the quality policy that is determined on the basis of the application information in the control server to the gateway that belongs to a network together with the control server.

Further, the electronic device 100 may receive the quality policy that is determined on the basis of the application information from the control server. The traffic flow may be controlled according to the quality policy that is received from the control server in the electronic device 100. Here, the quality policy may include the packet transmission priority or whether to block a packet that corresponds to the corresponding network session.

Figure 15:
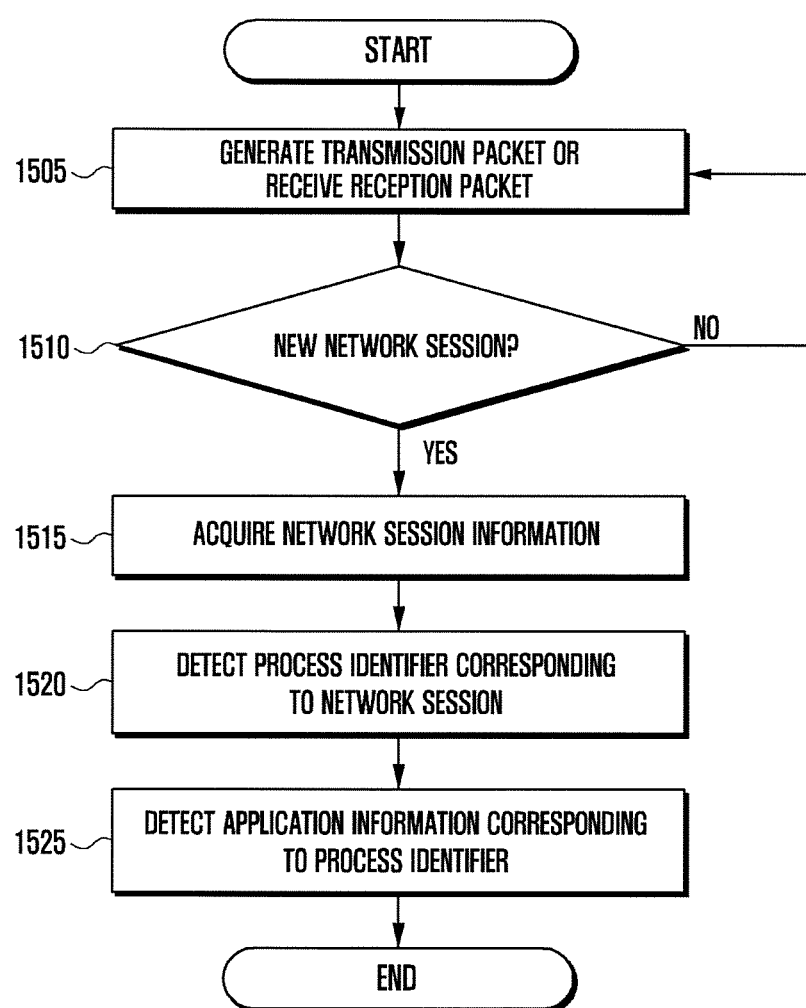
FIG. 15 is a flowchart illustrating, in more detail, an operation of acquiring application information in the electronic device of FIG. 14.

FIG. 15 is a flowchart illustrating, in more detail, an operation of acquiring application information in the electronic device of FIG. 14.

In order to form a new network session between the electronic device 100 and the service server, the electronic device 100 may acquire the application information when a transmission packet that is to be transmitted to the service server is generated or a reception packet is received from the service server.

At operation 1505, the electronic device 100 may generate the transmission packet, or may receive the reception packet.

At operation 1510, the electronic device 100 may confirm whether the transmission packet or the reception packet refers to the new network session. For example, the electronic device 100 may recognize whether the new network session is generated through confirmation of a flow table.

At operation 1515, the electronic device 100 may acquire new network session information.

At operation 1520, the electronic device 100 may detect the process identifier of the network session using the operating system of the electronic device 100. For example, the electronic device 100 may detect the process identifier that corresponds to the network session with reference to a session mapping table.

At operation 1525, the electronic device 100 may detect the application information that corresponds to the process identifier. For example, the electronic device 100 may detect the application information (e.g., application identifier) that corresponds to the process identifier using an application mapping table.

Figure 16:
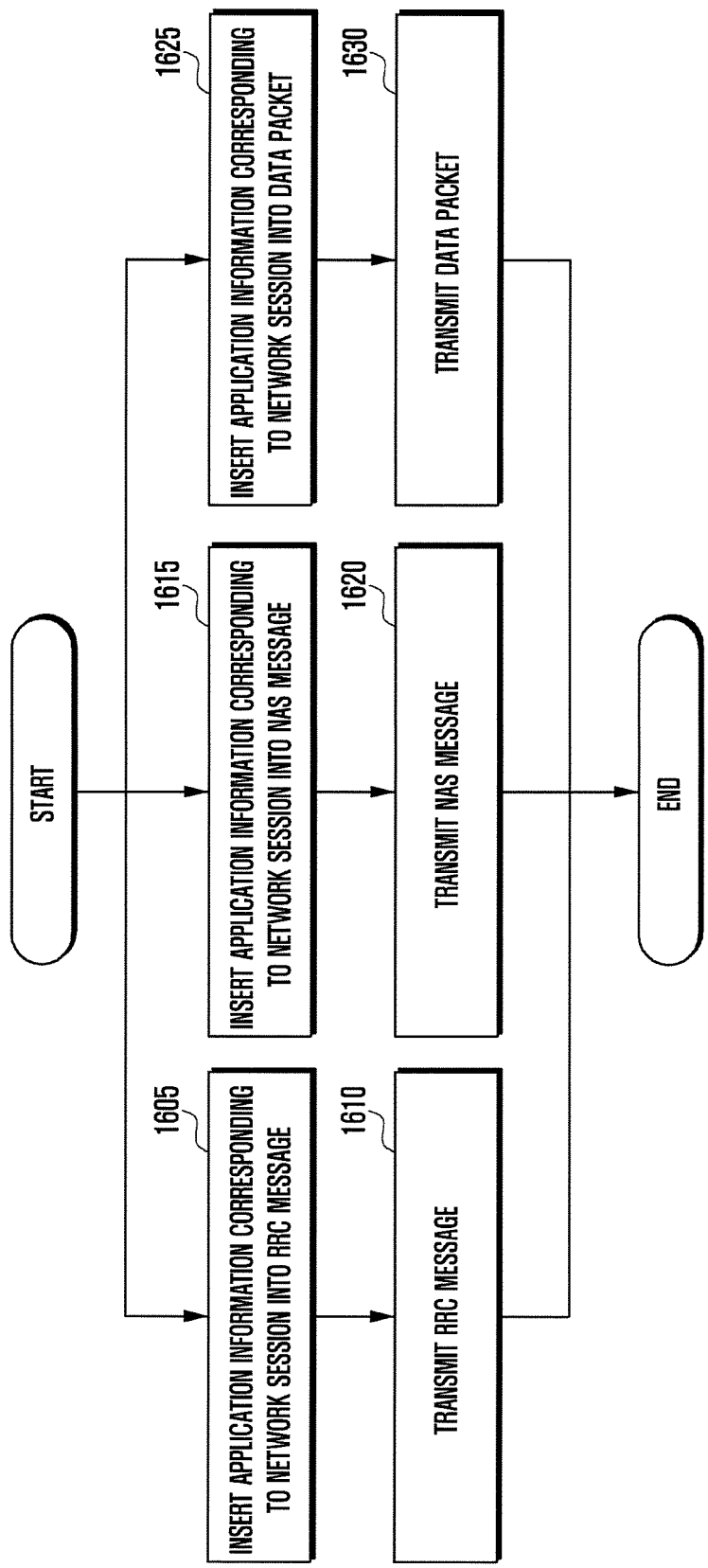
FIG. 16 is a flowchart illustrating, in more detail, an operation of transmitting application information in the electronic device of FIG. 14.

FIG. 16 is a flowchart illustrating, in more detail, an operation of transmitting application information in the electronic device of FIG. 14.

The operation of transmitting the application information (or application information and network session information) may be an operation for the control server to acquire the application information in the case where the electronic device 100 transmits at least one of a Radio Resource Control (RRC) message including the application information, a Non-Access Stratum (NAS) message and a data packet to the network.

Referring to FIG. 16, at operation 1605, the electronic device 100 may insert the application information that corresponding to the network session into the RRC message. At operation 1610, the electronic device 100 may transmit the RRC message to a base station that belongs to the network. The RRC message may be used to transmit/receive the control information. As an example, the RRC message may be used when the electronic device 100 reports the channel state that is measured by the electronic device 100 to the base station.

Further, at operation 1615, the electronic device 100 may insert the application information that corresponds to the network session into the NAS message. As an example, an information element that includes the application information or the network session information may be inserted into the NAS message. At operation 1620, the electronic device 100 may transmit the NAS message to a Mobility Management Entity (MME) that belongs to the network.

Figure 20:
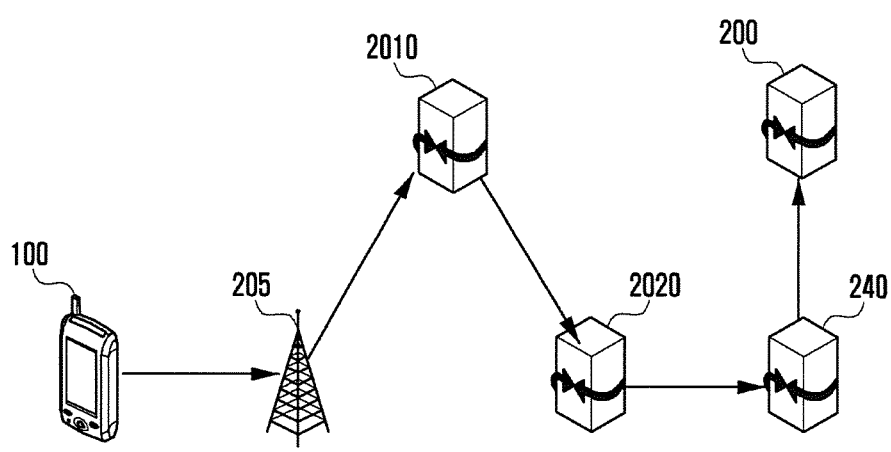
FIG. 20 is an exemplary diagram explaining a procedure of transmitting application information in a communication system according to an embodiment of the present invention.

For example, referring to FIG. 20, the electronic device 100 may transmit the NAS message that includes the application information to a base station 205. If the NAS message is received, the base station may relay the NAS message (or application information) to the MME 2010. The MME 2010 may transmit the application information that is included in the NAS message to a gateway 240 or a control server 200 through a gateway (e.g., S-GW) 2020. The gateway (e.g., P-GW) 240 may relay the application information that is received from the MME 2010 or the gateway (e.g., S-GW) 2020 to the control server 200.

Further, at operation 1625, the electronic device 100 may insert the application information that corresponds to the network session into a data packet. At operation 1630, the electronic device 100 may transmit the data packet that includes the application information to the gateway (e.g., P-GW) or the destination of the corresponding packet.

Figure 21:
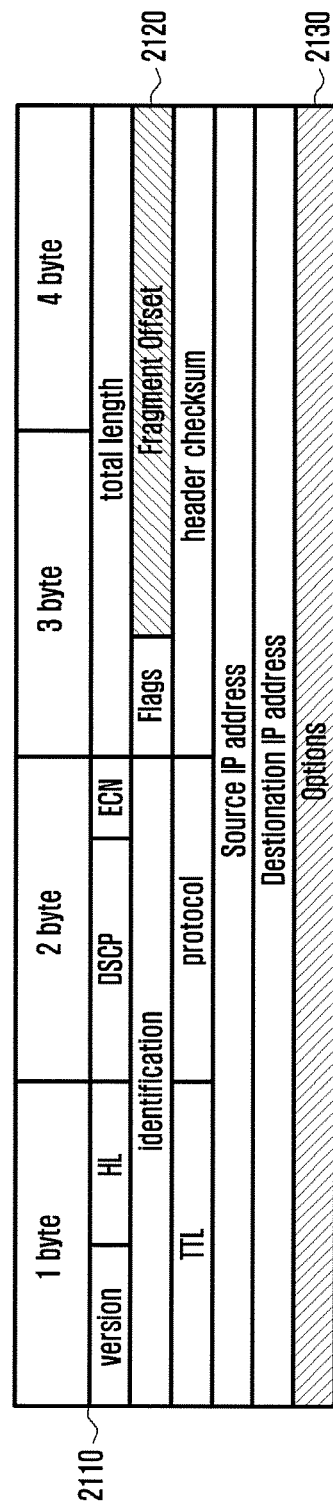
FIG. 21 is an exemplary diagram explaining an example in which application information is inserted into a data packet according to an embodiment of the present invention.

For example, referring to FIG. 21, the application information may be inserted into a header 2110 of the data packet. The application information may be indicated using a fragment offset field 2120 of the header 2110. The fragment offset field 2120 may also be used to indicate the order of division or divided packets in the case where a large Internet Protocol (IP) packet is divided into two or more packets. Since packet division is unnecessary in a Transmission Control Protocol (TCP) SYN/ACK packet or a UDP packet having a small size, the fragment offset field 2120 may be used to transmit the application information. Further, the application information may be indicated using an options field 2130 of the header 2110.

Further, the information that is transmitted to the network may include the network session information of the application together with the application information.

Further, the application information may be composed of different pieces of detailed information of the application information that are transmitted from the electronic device 100 to the network in the case where the application is driven at a first time and at a second time.

Figure 22:
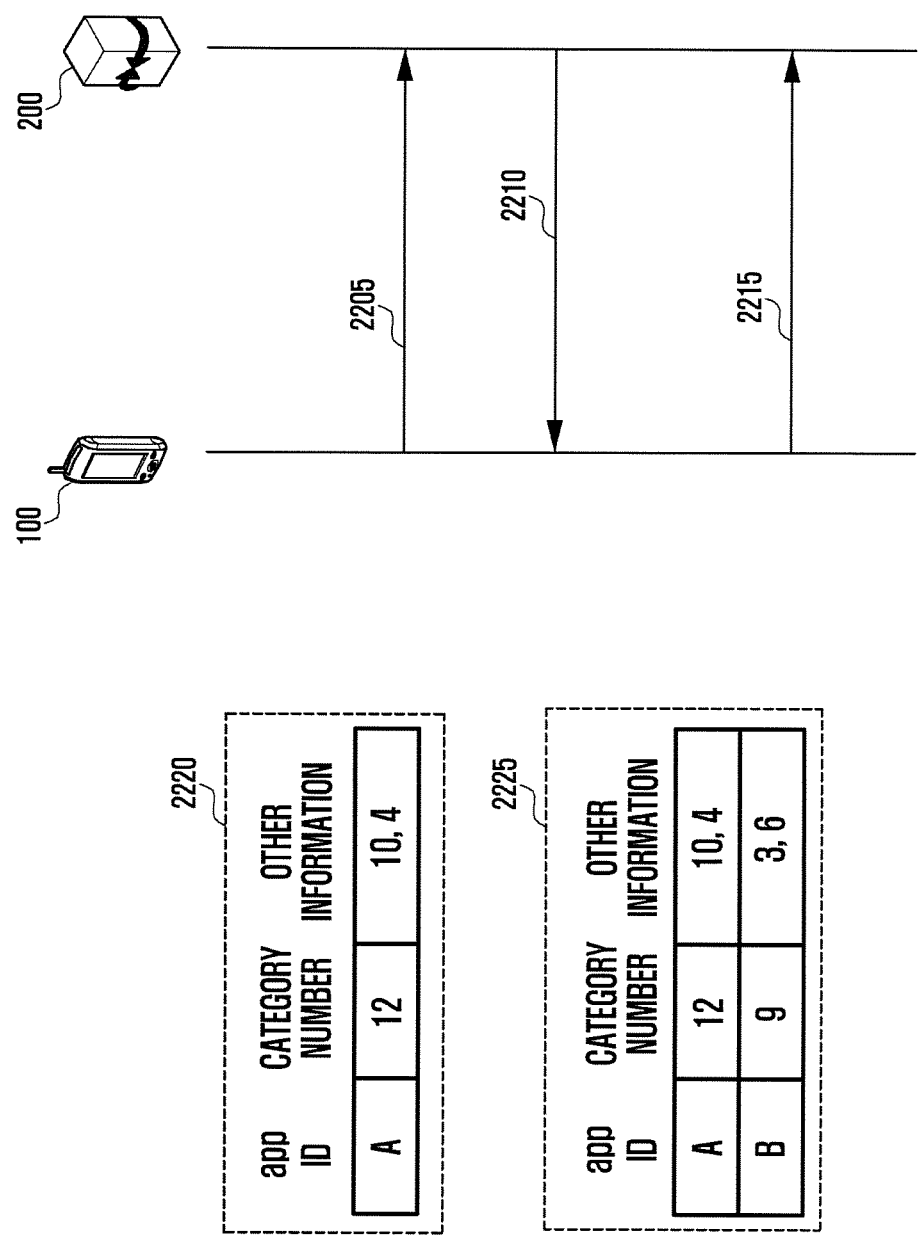
FIG. 22 is a diagram explaining application information that is transmitted in an electronic device according to an embodiment of the present invention.

For example, referring to FIG. 22, the electronic device 100 may store the application identifier, the category, or the required QoS in the form of a mapping table 2220 as information on the application. If an application that corresponds to application identifier "A" is driven in the electronic device 100, the electronic device 100 may transmit the category index "12" or the required QoS "10, 4" to the control server 200 as the application information.

As an example, if application identifier "B" is not detected in the mapping table 2220 in the case where the application is initially driven in the electronic device 100, at step 2205, the electronic device 100 may transmit the application identifier "B" to the control server 200 as the application information. At operation 2210, the control server 200 may transmit at least one of the category that corresponds to the application identifier "B" and the required QoS to the electronic device 100.

The electronic device 100 may receive at least one of the category (e.g., category index "9") that corresponds to the application identifier "B" and the required QoS (e.g., QCI "3, 6") from the control server 200 and may add the detailed information of the received application to the mapping table 2220 to maintain the updated mapping table 2225. In the case where the application having the application identifier "B" is re-driven, at operation 2215, the electronic device 100 may transmit the application information that includes at least one of the category and the QoS to the control server 200.

Further, if the application identifier is not detected in the application profile that is stored in the sever storage or neither the application category nor the QoS exists in the application profile, the control server 200 may request the application category from the electronic device 100. The electronic device 100 may receive the application category from a user using a user interface unit of the electronic device 100. As an example, if a request for the application category is received, the electronic device 100 may provide a user interface for requesting designation of the category to the user at a time when the application is executed or ended.

Further, the transmission of the application information is not limited to that as described above, but it should be noted that various methods for transmitting the application information can be used. One method or plural methods for transmitting the application information may be used together.

Referring to FIGS. 17 to 19, 24, and 25, a method for controlling traffic quality in a control server will be described. As an example, the control server may be one as exemplified in FIG. 6 or 7.

Figure 17:
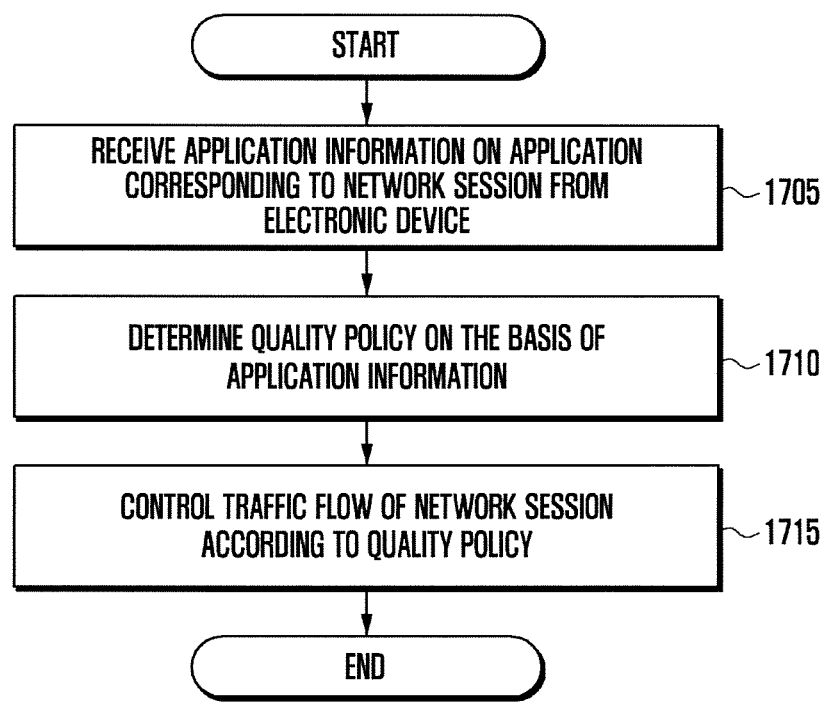
FIG. 17 is a flowchart illustrating a method for controlling traffic quality in a control server according to an embodiment of the present invention.

FIG. 17 is a flowchart illustrating a method for controlling traffic quality in a control server according to an embodiment of the present invention.

At operation 1705, the control server 200 may receive application information of an application that corresponds to a network session from the electronic device. Here, the application information may include at least one of an application identifier of an application, an application category, and QoS. Further, in order to form the network session between the electronic device and the service server, the application information may be acquired when a transmission packet that is to be transmitted from the electronic device to the service server is generated or a reception packet is received from the service server to the electronic device. Further, the application information may be acquired through detection of the process identifier that corresponds to the network session and the application information that corresponds to the process identifier in the electronic device.

Further, if the application information that is received from the electronic device is the application identifier, the control server 200 may transmit at least one of the category and the QoS corresponding to the application identifier to the electronic device. After the control server 200 transmits at least one of the category and the QoS to the electronic device, the application information that the control server 200 receives from the electronic device may be at least one of the category and the QoS.

Further, the control server 200 may maintain an application profile that includes information on the quality policy corresponding to the application information in a server storage unit.

At operation 1710, the control server 200 may determine the quality policy on the basis of the application information. Here, the quality policy may include at least one of whether to block the packet transmission, frequency bandwidth information, transmission rate information, buffering permission time information, and packet transmission priority. Further, the operation of determining the quality policy may include an operation of detecting information on the quality policy that is determined on the basis of the application information and protocol information of the network session in the application profile stored in the server storage unit. Further, the operation of determining the quality policy may be an operation of determining the quality policy of the traffic flow of the network session on the basis of at least one of the category, the QoS, and the network congestion state.

At operation 1715, the control server 200 may control the traffic flow of the network session according to the quality policy. For example, the control server 200 may transmit the determined quality policy to a gateway so that the traffic flow of the network session is controlled according to the quality policy in the gateway that belongs to the network together with the control server 200. Further, the control server 200 may transmit the quality policy to the electronic device so that the traffic flow of the network session is controlled in the electronic device according to the quality policy.

Figure 18:
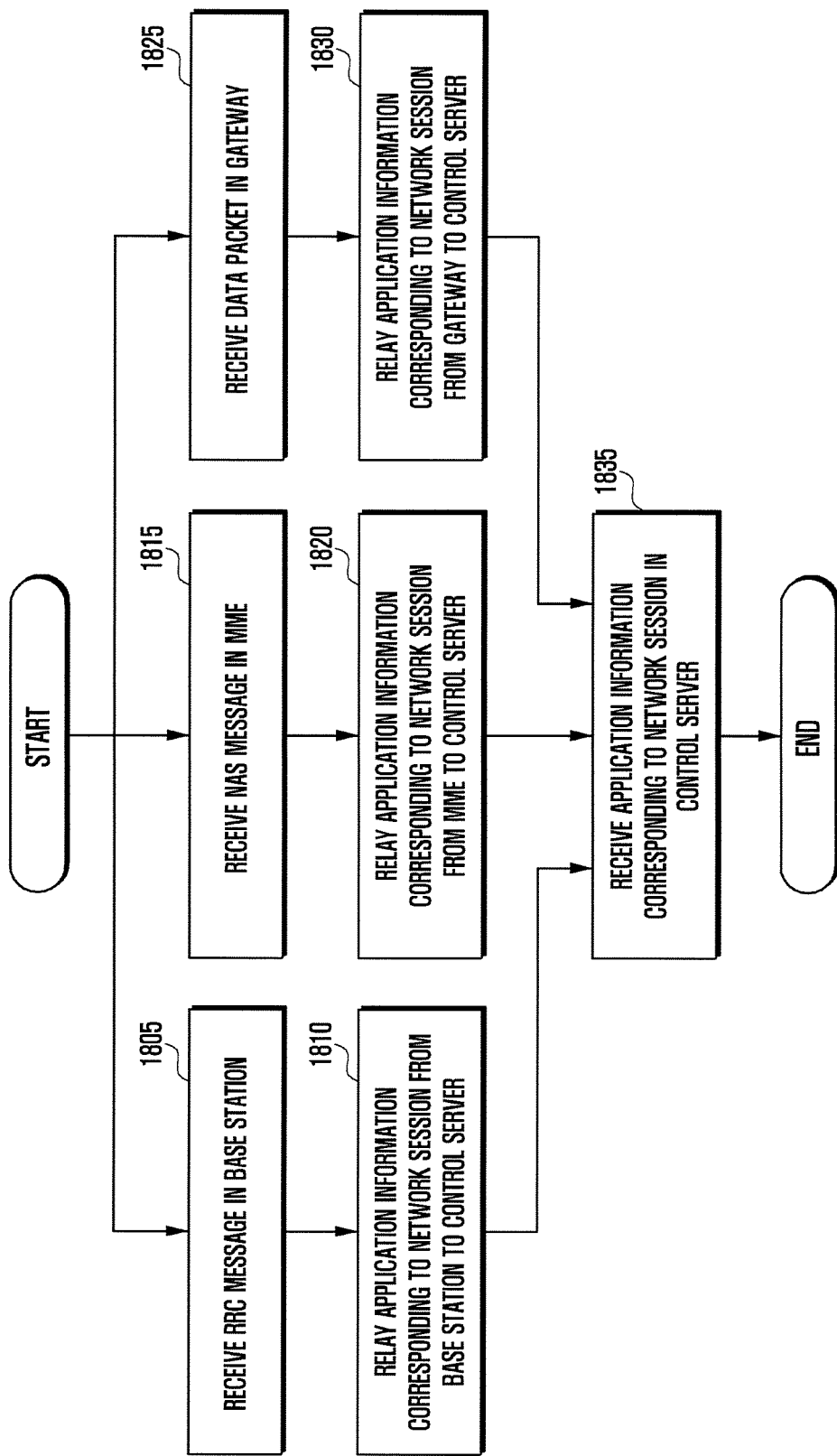
FIG. 18 is a flowchart illustrating, in more detail, an operation of receiving application information in the control server of FIG. 17.

FIG. 18 is a flowchart illustrating, in more detail, an operation of receiving application information in the control server of FIG. 17.

The operation of receiving the application information in the control server 200 may be an operation of acquiring the application information from at least one of a RRC message including the application information, a NAS message, and a data packet that are transmitted from the electronic device.

For example, at operation 1805, a base station may receive the RRC message that includes the application information or the network session information from the electronic device. At operation 1810, the base station may relay the application information that corresponds to the network session to the control server 200. At operation 1835, the control server 200 may receive the application information that corresponds to the network session that is transmitted from the base station.

Further, at operation 1815, the MME may receive the NAS message that includes the application information or the network session information from the electronic device. At operation 1820, the MME may relay the application information that corresponds to the network session to the control server. At operation 1835, the control server 200 may receive the application information that corresponds to the network session that is transmitted from the MME.

Further, at operation 1825, a gateway may receive a data packet that includes the application information or the network session information from the electronic device. At operation 1830, the gateway may relay the application information that corresponds to the network session to the control server. At operation 1835, the control server 200 may receive the application information that corresponds to the network session that is transmitted from the gateway.

Figure 19:
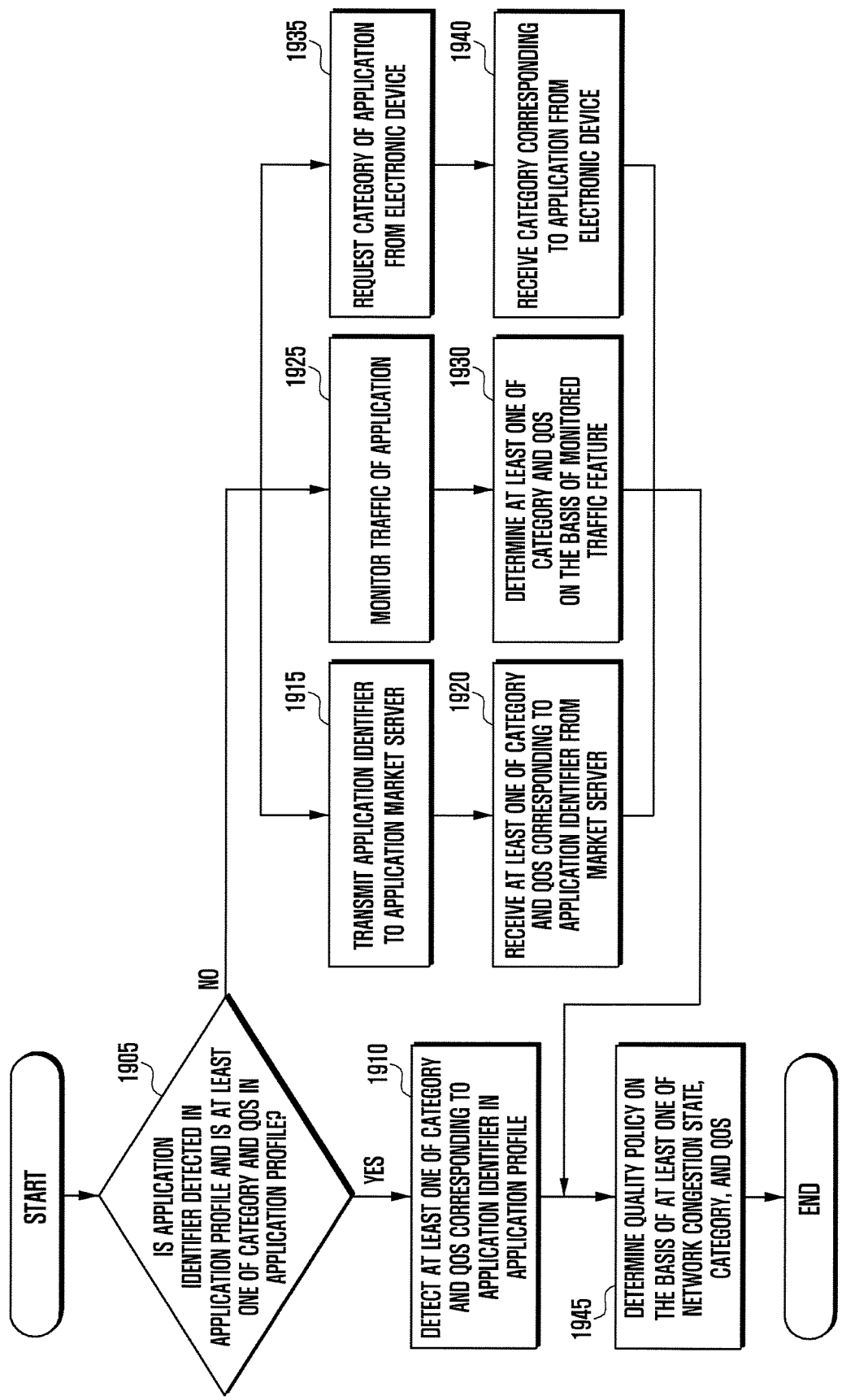
FIG. 19 is a flowchart illustrating, in more detail, an operation of determining a quality policy in the control server of FIG. 17.

FIG. 19 is a flowchart illustrating, in more detail, an operation of determining a quality policy in the control server of FIG. 17.

If the application identifier is received from the electronic device 100 as the application information, at operation 1905, the control server 200 may detect the application identifier from the application profile, and may confirm whether at least one (or all) of the category and the QoS exists in the application profile.

If the application identifier is detected in the application profile and the at least one (or all) of the category and the QoS exists in the application profile, at operation 1910, the control server 200 may detect at least one of the category and the QoS corresponding to the application identifier from the application profile. Further, if the quality policy that corresponds to the application identifier can be determined with reference to the application profile, the operation 1910 may be omitted. If the operation 1910 is omitted, at operation 1945, the quality policy may be determined on the basis of the application profile and the application information (e.g., application identifier).

If the application identifier that belongs to the application information is not detected in the application profile that is stored in the server storage unit, or all the category and the QoS of the application in the application information do not exist in the application profile, the control server 200 may enter into the operation 1915, 1925, or 1935 to perform the corresponding operation.

At operation 1915, the control server 200 may transmit the application identifier to the application market server as the application information. At operation 1920, the control server 200 may receive at least one of the category and the QoS corresponding to the application identifier from the application market server.

Further, at operation 1925, the control server 200 may monitor the application traffic. At operation 1930, the control server 200 may determine at least one of the category and the QoS corresponding to the application identifier on the basis of the monitored traffic feature.

Further, at operation 1935, the control server may request the application category from the electronic device. At operation 1940, the control server 200 may receive the category that corresponds to the application from the electronic device.

At operation 1945, the control server 200 may determine the quality policy on the basis of at least one of the traffic flow state of the network session, the category, and the QoS. For example, the control server 200 may select or determine the required QoS or the action in the network congestion state with reference to the application identifier, the application category, protocol information of the network session of the application, or the network congestion state (or degree of network congestion).

Figure 24:
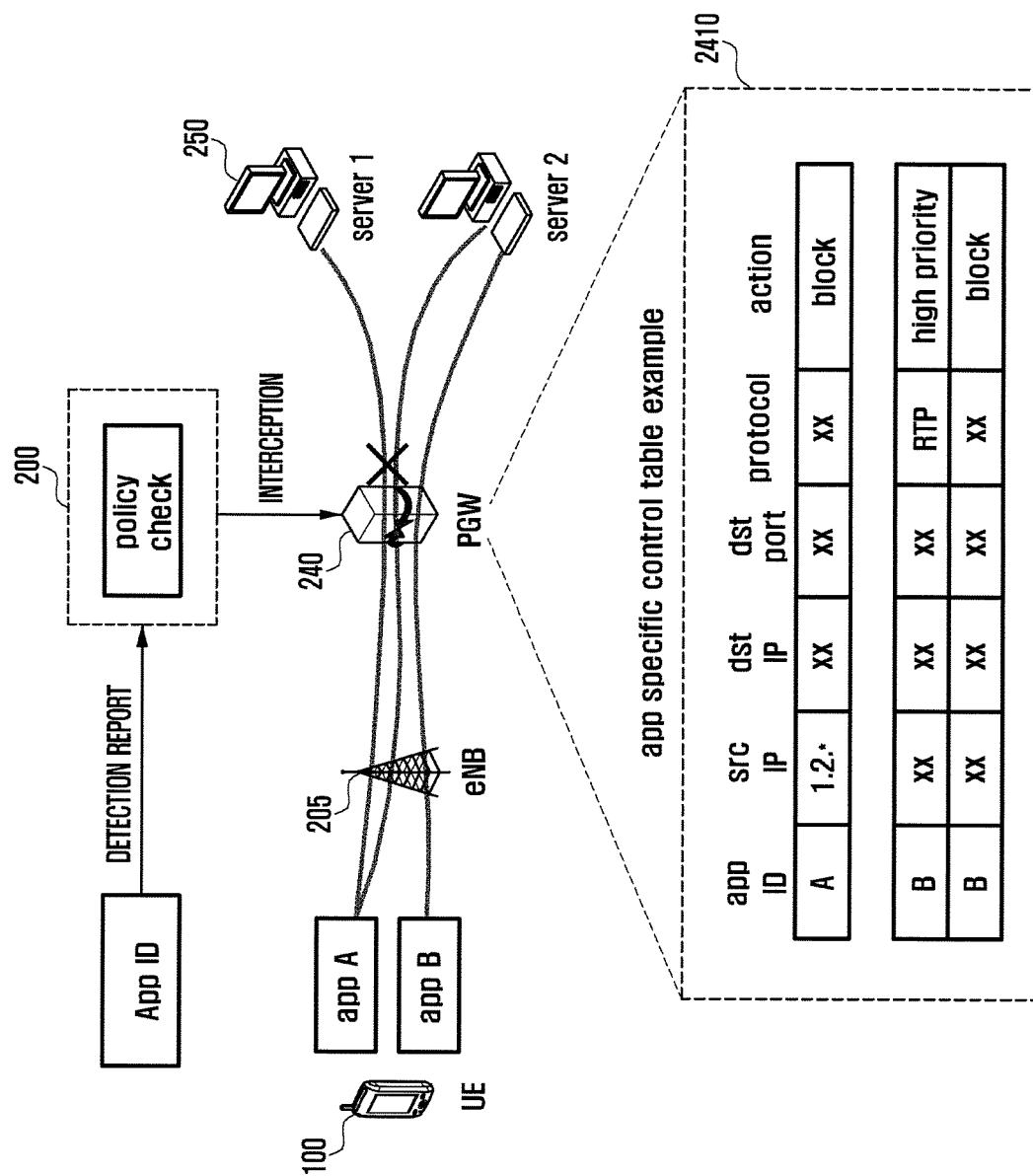
FIG. 24 is an exemplary diagram explaining traffic flow control according to an embodiment of the present invention.
Figure 25:
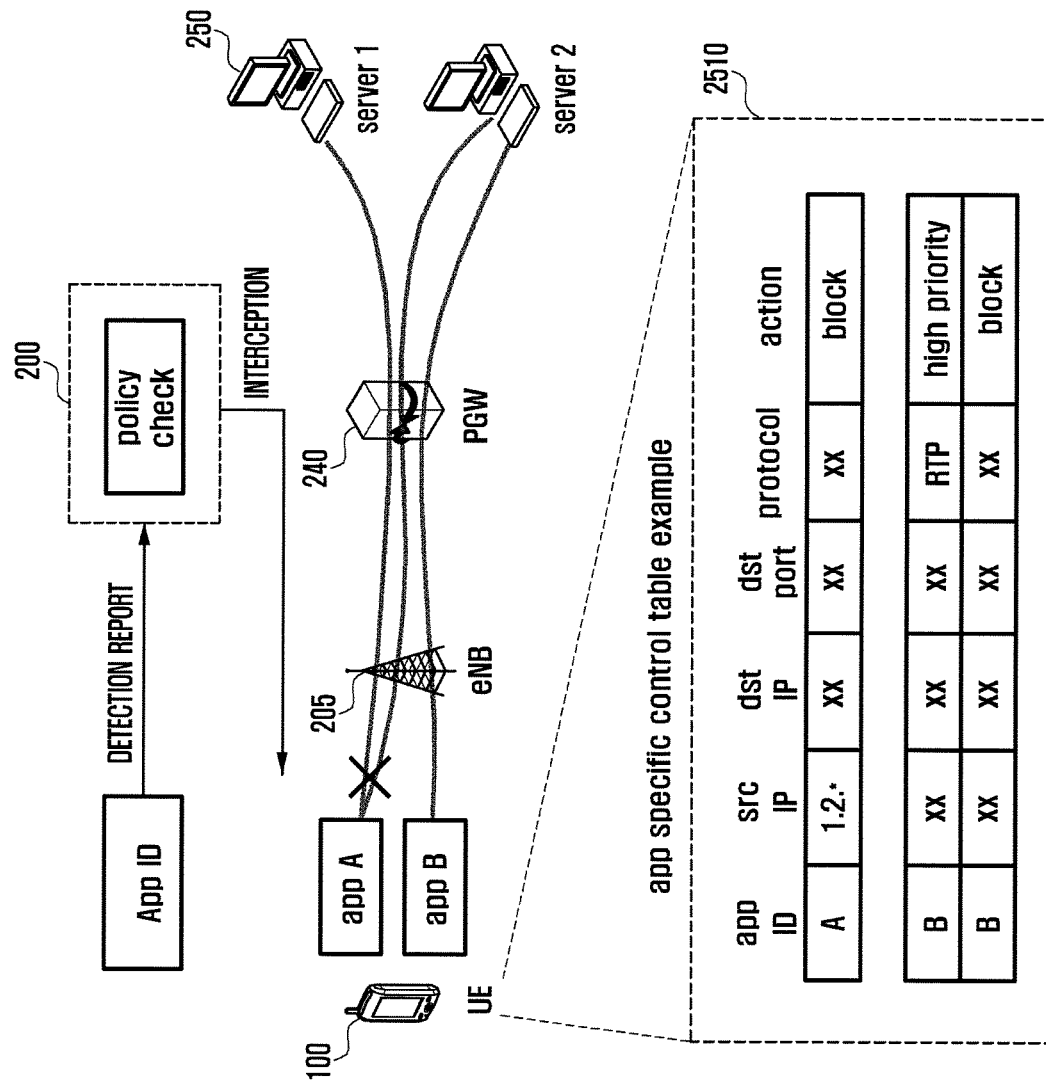
FIG. 25 is another exemplary diagram explaining traffic flow control according to an embodiment of the present invention.

FIGS. 24 and 25 are exemplary diagram explaining traffic flow control according to an aspect of the present invention.

The electronic device 100 may provide a communication service between the electronic device 100 and the service server 250 using an application. As an example, the service server 250 may include a first server and a second server. The electronic device 100 and the service server 250 may form a communication link through the network, and the base station (e.g., eNB) 205, the gateway (e.g., P-GW) 240, or the control server (e.g., PCRF) 200 may be included in the network.

For example, application "A" or application "B" that corresponds to application identifier "A" or "B" may be driven in the electronic device 100. If the application "A" is driven, a first network session of the communication link between the electronic device 100 and the first server and a second network session of the communication link between the electronic device 100 and the second server may be generated. Further, if the application "B" is driven, a third network session and a fourth network session of the communication link between the electronic device 100 and the second server may be generated. Here, the third network session and the fourth network session may have different protocols. As an example, the protocol may be TCP, UDP, RIP, Hyper Text Transfer Protocol (HTTP), Secure Socket Layer (SSL), Real time Transport Control Protocol (RTCP), Session Initiation Protocol (SIP), or Session Description Protocol (SDP).

Referring to FIG. 24, the electronic device 100 may detect the application information or new network session information and may report the application information or the new network session information to the control server 200. The control server 200 may determine the quality policy on the basis of the application information or the network session information. For example, the control server 200 may transmit a control table 2410 that corresponds to the application identifier or the protocol to the gateway 240 as information on the quality policy.

The gateway 240 may control the traffic flow that corresponds to the network session with reference to a control table 2410. Blocking of packet transmission may be included in the control table 2410 with respect to the first network session and the second network session corresponding to the application "A" as the action in the network congestion state. In the network congestion state, the gateway 240 may block the packet transmission with respect to the first network session and the second network session according to the control table 2410. Further, in the network congestion state, the gateway 240 may operate to transmit a packet for the third network session of which the protocol is RTP at high priority and to block or discard a packet for the fourth network session using another protocol. The communication service using RTP may be Voice over IP (VoIP) or video call.

Further, referring to FIG. 25, the electronic device 100 may detect the application information or new network session information and may report the application information or the new network session information to the control server 200. The control server 200 may determine the quality policy on the basis of the application information or the network session information. For example, the control server 200 may transmit a control table 2510 that corresponds to the application identifier or the protocol to the electronic device 100 as information on the quality policy.

Referring to FIG. 8, the electronic device 100 may receive information on the quality policy that is transmitted from the control server 200 through a Policy and Charging Rule Function (PCRF) module 241. The application detection module 111 of the electronic device 100 may perform generation or transmission of the packet of the network session of the application through control of the data plane module 112 according to the received quality policy.

Further, in order to prevent illegal use or hacking to avoid application of the quality policy in the electronic device 100, the electronic device 100 may check the change of the operating system 122 or may detect an access to non-permitted system level or system file. For example, the electronic device 100 may manage a flash counter for the operating system. The electronic device 100 may transmit a flash counter value that is increased whenever the operating system is updated to the network 203 (or control server 200). As an example, the electronic device 100 may transmit network session information, application information, and flash counter values to the control server 200. The control server 200 may compare a flash counter value according to an official update of the operating system 122 that is allowed by an enterpriser or a service provider with the flash counter value that is received from the electronic device 100. If the flash counter values are equal to each other as the result of the comparison, the control server 200 may determine that the application information that is received from the electronic device 100 is reliable. Further, if a flash counter value that is changed due to the unofficial operating system image is detected, the control server 200 may determine that there is a non-permitted access to the electronic device 100. If it is determined that there exists a non-permitted access to the electronic device 100, the control server 200 may block the traffic that corresponds to the corresponding network session or may determine the quality policy so that the minimum data rate or a default bandwidth is allocated. Further, the application detection module 111 of the electronic device 100 may compare the flash counter value with the value received from the network 203, an may determine whether to perform communication with respect to the network session due to the application according to the result of the comparison.

The electronic device 100 may control the traffic flow that corresponds to the network session with reference to a control table 2510. Blocking of packet transmission may be included in the control table 2510 with respect to the first network session and the second network session corresponding to the application "A" as the action in the network congestion state. In the network congestion state, the electronic device 100 may block the packet transmission with respect to the first network session and the second network session according to the control table 2510. Further, in the network congestion state, the electronic device 100 may operate to transmit a packet for the third network session of which the protocol is RTP at high priority and to block or discard a packet for the fourth network session using another protocol.

Figure 26:
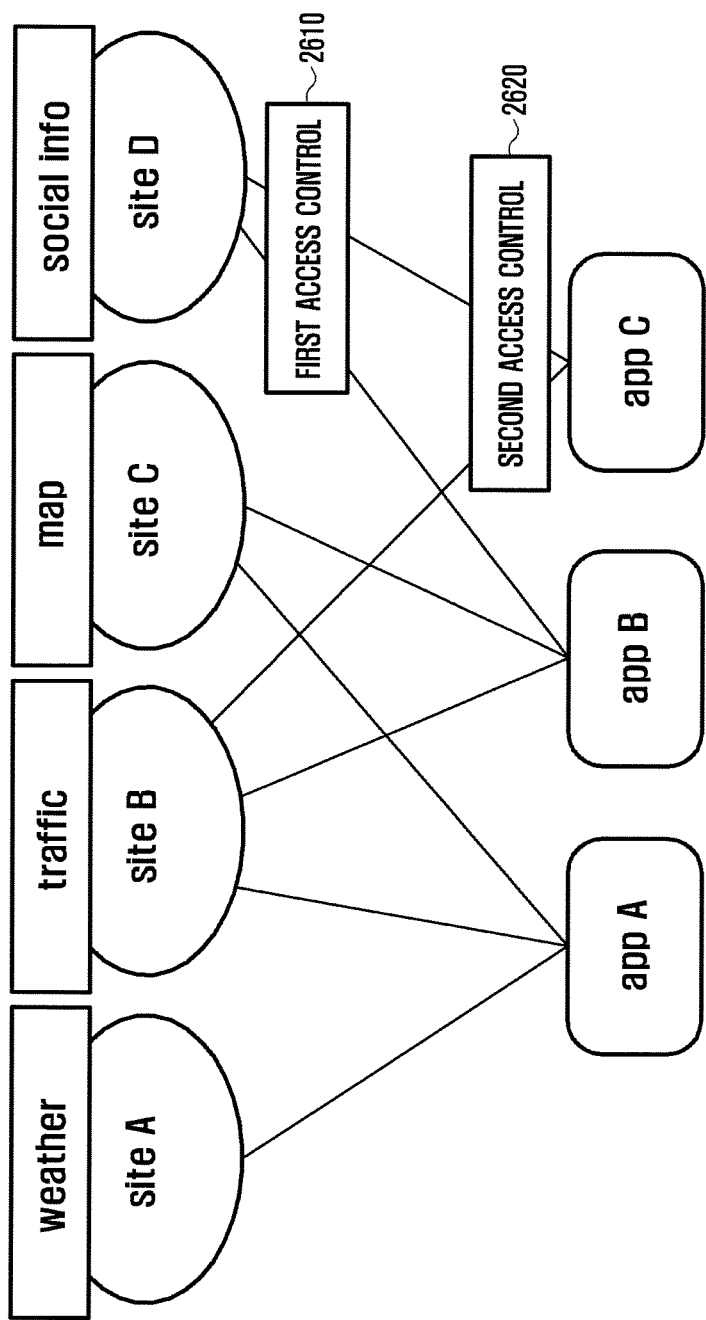
FIG. 26 is an exemplary diagram explaining a relationship between a communication service of an application and traffic quality control according to an embodiment of the present invention.

FIG. 26 is an exemplary diagram explaining a relationship between a communication service of an application and traffic quality control according to an embodiment of the present invention.

An electronic device may include a portable terminal that can install and drive a plurality of applications including the application through the operating system.

Referring to FIG. 26, in at least one electronic device, application "app A", application "app B", or application "app C" may be driven. Service servers that provide services to the applications may be "site A" that provides weather information, "site B" that provide traffic information, "site C" that provides map information, and "site D" that provides social information.

For example, the control server or the gateway may measure or predict the traffic volume of a service server (e.g., site D) using the network session information included in the data packet through inspection of the data packet from the traffic flow of the network. In the case of the network congestion state or in the case where the congestion state is expected, the control server or the gateway in the network may perform a first access control 2610 with respect to the service server "site D".

As an example, the control server is a gateway for the quality policy, and may instruct an action to block the packet transmission related to the "site D" in the network congestion state. Network session information having information related to a destination address or a source address "site D" is included in the data packet, and the corresponding network session is generated through an access to form a new communication link. In the case where the network congestion state is expected, the gateway may block the traffic with respect to the new network session having information related to "site D" as the first access control 2610, or may discard the corresponding packet.

If the first access control 2610 is performed, at least one electronic device that drives "app B" and "app C" that require communication connection to the service server "site D" is unable to receive social information from "site D", and thus it may be impossible to perform a function related to "app B" and "app C" or a communication service.

Further, the control server may predict the traffic volume or control the traffic flow of the network session of the application according to the application information or session information that is received from the electronic device. In this case, it may be possible to perform more accurate traffic quality control than the traffic prediction method through inspection of the data packet in the network, or the traffic prediction cost can be reduced. For example, in the case of the network congestion state or in the case where the congestion state is expected, the control server may perform a second access control 2620 with respect to the network session of the application "app C". The control server is a gateway or at least one electronic device that drives "app C", and may instruct an action to block the packet transmission of the network session for "app C" in the network congestion state as the quality policy. The gateway or the at least one electronic device that drives "app C" may block the packet transmission with respect to the new network session having information related to "app C" as the second access control 2620, or may discard the corresponding packet.

If the second access control 2620 is performed, at least one electronic device that drives "app C" is unable to request or receive traffic information of the service server "site B" that is required for "app C" and the social information of "site D", and thus it may be impossible to perform a function related to "app C" or a communication service. In this case, since an access to the service server "site B" and "site D" is not intercepted with respect to other applications excluding "app C", services for "app A" and "app B" may be provided in the at least one electronic device that drives the application "app A" and "app B".

Further, the control server may selectively perform the first access control 2610 and the second access control 2620 in consideration of the connection amount of the service server and the traffic feature according to the application.

Further, the order of the operations explained as the procedure or method for controlling the traffic quality through FIGS. 14 to 19 may not be optionally changed or a part of the operations may be omitted. Further, the operations may be performed through partial combination of the above-described embodiments.

Further, it could be understood by those of ordinary skill in the art that a program according to an embodiment as described above with reference to FIGS. 14 to 19 may be configured by software, hardware, or a combination thereof. Further, the program according to an embodiment may be recorded in a recording medium, and may be downloaded from a server or a computer to the electronic device or the control server through a communication network.

Meanwhile, preferred embodiments of the present invention disclosed in this specification and drawings and specific terms used therein are illustrated to present only specific examples in order to clarify the technical contents of the present invention and help understanding of the present invention, but are not intended to limit the scope of the present invention. It will be evident to those skilled in the art that various implementations based on the technical spirit of the present invention are possible in addition to the disclosed embodiments.

The invention claimed is:

1. A method of a server for controlling a traffic flow in a communication system, the method comprising:
receiving congestion information of a network from a node of the network;
monitoring a traffic flow corresponding to an application in the network;
identifying information on the traffic flow based on a result of the monitoring;
determining characteristic information corresponding to the application based on the information on the traffic flow; and
controlling at least one of buffering permission time information corresponding to the application and whether to block a packet transmission corresponding to the application based on the congestion information of the network and the characteristic information corresponding to the application.

2. The method of claim 1, wherein the characteristic information corresponding to the application comprises at least one of a category of the application and quality of service corresponding to the application.

3. The method of claim 1, further comprising:
receiving, if identification information of the application is acquired, the characteristic information corresponding to the application from an application server or a terminal.

4. The method of claim 1, wherein the traffic flow is controlled based on flash counter information of the application.

5. A method for communication of a terminal in communication system, the method comprising:
generating a packet associated with a traffic flow corresponding to an application; and
transmitting the packet to a node of a network, and
wherein information on the traffic flow is identified based on a result of a monitoring for the traffic flow,
wherein characteristic information corresponding to the application is determined based on the information on the traffic flow,
wherein at least one of buffering permission time information corresponding to the application and whether to block a packet transmission corresponding to the application is controlled based on congestion information of the network and the characteristic information corresponding to the application, and
wherein the characteristic information corresponding to the application and the congestion information of the network are received from the node of the network.

6. The method of claim 5, wherein the characteristic information corresponding to the application comprises at least one of a category of the application and quality of service corresponding to the application.

7. The method of claim 5, further comprising:
transmitting the characteristic information corresponding to the application to a server.

8. The method of claim 5, wherein the traffic flow is controlled based on flash counter information of the application.

9. A server of a communication system, the server comprising:
a transceiver configured to transmit and receive a signal; and a controller coupled to the transceiver and configured to:
control the transceiver to receive congestion information of a network from a node of the network,
monitor a traffic flow corresponding to an application in the network, identify information on the traffic flow based on a result of the monitoring, determine characteristic information corresponding to the application based on the information on the traffic flow, and
control at least one of buffering permission time information corresponding to the application and whether to block a packet transmission corresponding to the application based on the congestion information of the network and the characteristic information corresponding to the application.

10. The server of claim 9, wherein the characteristic information corresponding to the application comprises at least one of a category of the application and quality of service corresponding to the application.

11. The server of claim 9, wherein the controller is further configured to receive, if identification information of the application is acquired, the characteristic information corresponding to the application from an application server or a terminal.

12. The server of claim 9, wherein the controller is further configured to control, if congestion is detected at the network, the traffic flow based on at least one of buffering permission time information corresponding to the application and whether to block a packet transmission corresponding to the application.

13. The server of claim 9, wherein the traffic flow is controlled based on flash counter information of the application.

14. A terminal of a communication system, the terminal comprising:
- a transceiver configured to transmit and receive a signal; and
- a controller coupled to the transceiver and configured to:
  - generate a packet associated with a traffic flow corresponding to an application, and
  - transmit the packet to a node of a network, and
- wherein information on the traffic flow is identified based on a result of a monitoring for the traffic flow,
- wherein characteristic information corresponding to the application is determined based on the information on the traffic flow, and
- wherein at least one of buffering permission time information corresponding to the application and whether to block a packet transmission corresponding to the application is controlled based on congestion information of the network and the characteristic information corresponding to the application, and
- wherein the congestion information of the network and the characteristic information corresponding to the application are received from the node of the network.

15. The terminal of claim 14, wherein the characteristic information corresponding to the application comprises at least one of a category of the application and quality of service corresponding to the application.

16. The terminal of claim 14, wherein the controller is further configured to transmit the characteristic information corresponding to the application to a server.

17. The terminal of claim 14, wherein the traffic flow is controlled based on at least one of buffering permission time information corresponding to the application and whether to block a packet transmission corresponding to the application, if congestion is detected at the network.

18. The terminal of claim 14, wherein the traffic flow is controlled based on flash counter information of the application.

* * * * *